(12) United States Patent
Porat

(10) Patent No.: US 9,379,859 B2
(45) Date of Patent: *Jun. 28, 2016

(54) DOWNCLOCKING AND/OR ADAPTIVE SUB-CARRIERS FOR SINGLE USER, MULTIPLE USER, MULTIPLE ACCESS, AND/OR MIMO WIRELESS COMMUNICATIONS

(71) Applicant: BROADCOM CORPORATION, Irvine, CA (US)

(72) Inventor: Ron Porat, San Diego, CA (US)

(73) Assignee: BROADCOM CORPORATION, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/721,146

(22) Filed: May 26, 2015

(65) Prior Publication Data

US 2015/0256304 A1  Sep. 10, 2015

Related U.S. Application Data

(63) Continuation of application No. 13/448,312, filed on Apr. 16, 2012, now Pat. No. 9,048,994.

(60) Provisional application No. 61/476,746, filed on Apr. 18, 2011, provisional application No. 61/478,707, filed on Apr. 25, 2011, provisional application No. 61/557,152, filed on Nov. 8, 2011.

(51) Int. Cl.
*H04W 4/00* (2009.01)
*H04L 5/00* (2006.01)
(Continued)

(52) U.S. Cl.
CPC ............ *H04L 5/0023* (2013.01); *H04L 5/0044* (2013.01); *H04L 5/0055* (2013.01);
(Continued)

(58) Field of Classification Search
CPC ......................................................... H04W 4/00
USPC ........................................................... 370/338
See application file for complete search history.

(56) References Cited

FOREIGN PATENT DOCUMENTS

EP      1533963 A2    5/2005

OTHER PUBLICATIONS

European Patent Office; Summons to attend oral proceedings; EP Application No. 12002702.4; Jun. 30, 2015; pp. 1-8.

(Continued)

*Primary Examiner* — Shirpal Khajuria
(74) *Attorney, Agent, or Firm* — Garlick & Markison; Shayne X. Short

(57) ABSTRACT

Downclocking and/or adaptive sub-carriers for single user, multiple user, multiple access, and/or MIMO wireless communications. Communication device operation within a wireless local area network (WLAN/WiFi) is effectuated in the frequency spectra typically associated with television broadcast channels. Operation is made on a secondary non-interfering basis to such television broadcast channels. Any desired channel bandwidth (e.g., 6 MHz, 7 MHz, 8 MHz, etc.) may be employed. Adaptation with respect to the number of data sub-carriers within different respective packets may be made in accordance with two or more respective operational modes. For example, modification of the number of data sub-carriers in different respective packets may be made to increase the signal bandwidth from a first band was to a second bandwidth. Also, appropriate frequency down-clocking of a first channel bandwidth may be performed to generate the desired channel bandwidth to be employed within an available television broadcast channel bandwidth.

20 Claims, 20 Drawing Sheets

(51) Int. Cl.
    *H04W 72/00*      (2009.01)
    *H04W 84/12*      (2009.01)
(52) U.S. Cl.
    CPC ............ *H04L5/0066* (2013.01); *H04L 5/0092* (2013.01); *H04W 72/005* (2013.01); *H04L 5/0098* (2013.01); *H04W 84/12* (2013.01)

(56) References Cited

OTHER PUBLICATIONS

Heejung Yu (ETRI): Coverage extension for IEEE802.11ah; IEEE-SA Mentor, vol. 802.11ah, Jan. 13, 2011; pp. 1-10 [retrieved on Jan. 13, 2011].

Heejung Yu, et al.; Coverage extension for IEEE 802.11ah, doc.; IEEE 802. 11-11/0035rl; Jan. 12, 2011; pp. 1-10.

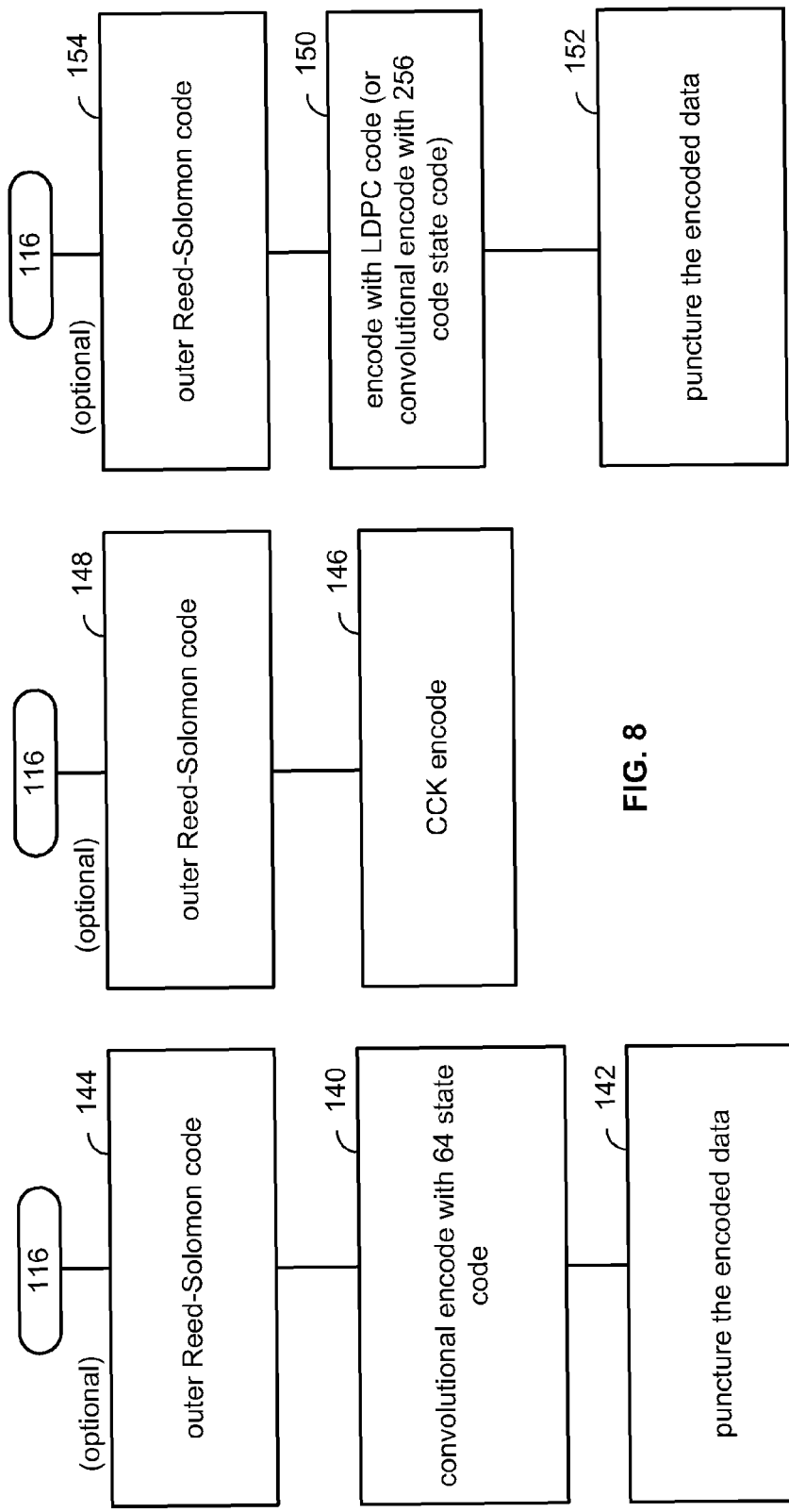

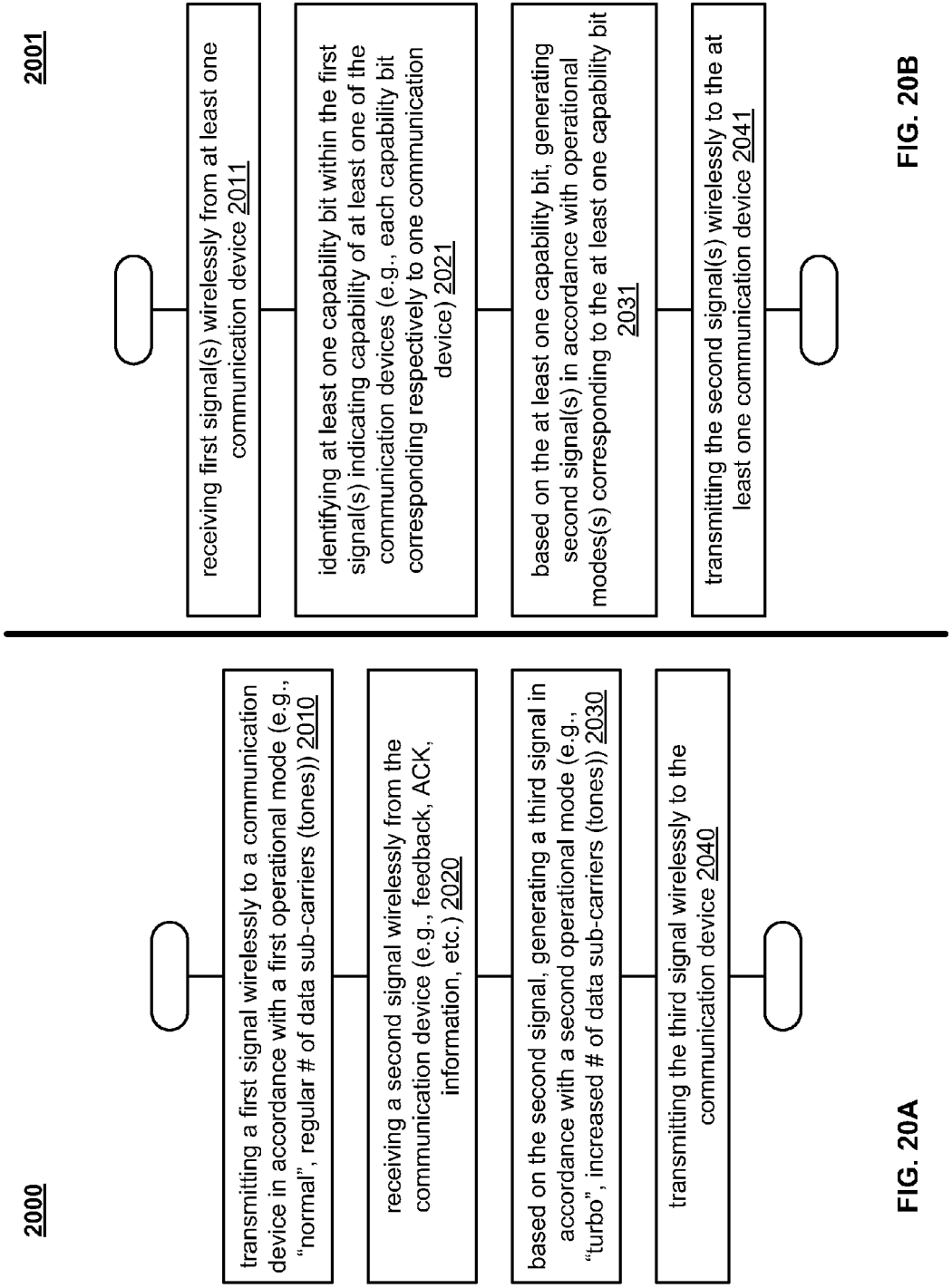

DOWNCLOCKING AND/OR ADAPTIVE SUB-CARRIERS FOR SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

The present U.S. Utility Patent Application claims priority pursuant to 35 U.S.C. §120 as a continuation of U.S. Utility application Ser. No. 13/448,312, entitled "Downclocking and/or adaptive sub-carriers for single user, multiple user, multiple access, and/or MIMO wireless communications," filed Apr. 16, 2012, pending, and scheduled subsequently to be issued as U.S. Pat. No. 9,048,994 on Jun. 2, 2015 (as indicated in an ISSUE NOTIFICATION mailed from the USPTO on May 13, 2015), which claims priority pursuant to 35 U.S.C. §119(e) to U.S. Provisional Application No. 61/476,746, entitled "Range extension within multiple user, multiple access, and/or MIMO wireless communications," filed Apr. 18, 2011; U.S. Provisional Application No. 61/478,707, entitled "Frequency selective transmission within multiple user, multiple access, and/or MIMO wireless communications," filed Apr. 25, 2011; and U.S. Provisional Application No. 61/557,152, entitled "Downclocking with adaptive sub-carriers for single user, multiple user, multiple access, and/or MIMO wireless communications," filed Nov. 8, 2011, all of which are hereby incorporated herein by reference in their entirety and made part of the present U.S. Utility Patent Application for all purposes.

Incorporation by Reference

The following U.S. Utility Patent Applications are hereby incorporated herein by reference in their entirety and made part of the present U.S. Utility Patent Application for all purposes:

1. U.S. Utility patent application Ser. No. 13/448,301, entitled "Range extension within multiple user, multiple access, and/or MIMO wireless communications," filed concurrently on Apr. 16, 2012, pending.

2. U.S. Utility patent application Ser. No. 13/448,307, entitled "Frequency selective transmission within multiple user, multiple access, and/or MIMO wireless communications," filed concurrently on Apr. 16, 2012, pending.

Incorporation by Reference

The following IEEE standards/draft standards are hereby incorporated herein by reference in their entirety and are made part of the present U.S. Utility Patent Application for all purposes:

1. IEEE Std 802.11™—2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™—2012, (Revision of IEEE Std 802.11—2007), 2793 total pages (incl. pp. i-xcvi, 1-2695).

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 total pages (incl. pp. i-xxxii, 1-502).

3. IEEE Draft P802.11-REVmb™/D12, November 2011 (Revision of IEEE Std 802.11™—2007 as amended by IEEE Std 802.11k™—2008, IEEE Std 802.11r™—2008, IEEE Std 802.11y™—2008, IEEE Std 802.11w™—2009, IEEE Std 802.11n™—2009, IEEE Std 802.11p™—2010, IEEE Std 802.11z™—2010, IEEE Std 802.11v™—2011, IEEE Std 802.11u™—2011, and IEEE Std 802.11s™—2011), "IEEE Standard for Information technology—Telecommunications and information exchange between systems—Local and metropolitan area networks—Specific requirements; Part 11: Wireless LAN Medium Access Control (MAC) and Physical Layer (PHY) Specifications," Prepared by the 802.11 Working Group of the LAN/MAN Standards Committee of the IEEE Computer Society, 2910 total pages (incl. pp. i-cxxviii, 1-2782).

4. IEEE P802.11ac™/D2.1, March 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338).

5. IEEE P802.11ad™/D6.0, March 2012, (Draft Amendment based on IEEE P802.11REVmb D12.0), (Amendment to IEEE P802.11REVmb D12.0 as amended by IEEE 802.11ae D8.0 and IEEE 802.11aa D9.0), "IEEE P802.11ad™/D6.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 664 total pages.

6. IEEE Std 802.11ae™—2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11 ae™—2012, (Amendment to IEEE Std 802.11™—2012), 52 total pages (incl. pp. i-xii, 1-38).

7. IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118).

BACKGROUND OF THE INVENTION

1. Technical Field of the Invention

The invention relates generally to communication systems; and, more particularly, it relates to wireless local area network (WLAN/WiFi) operations in television channels within single user, multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802, 11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIGS. 7-9 are diagrams illustrating various embodiments for encoding the scrambled data.

FIG. 19A, FIG. 19B, FIG. 20A, and FIG. 20B are diagrams illustrating embodiments of methods for operating one or more wireless communication devices.

DETAILED DESCRIPTION OF THE INVENTION

Figure 1:
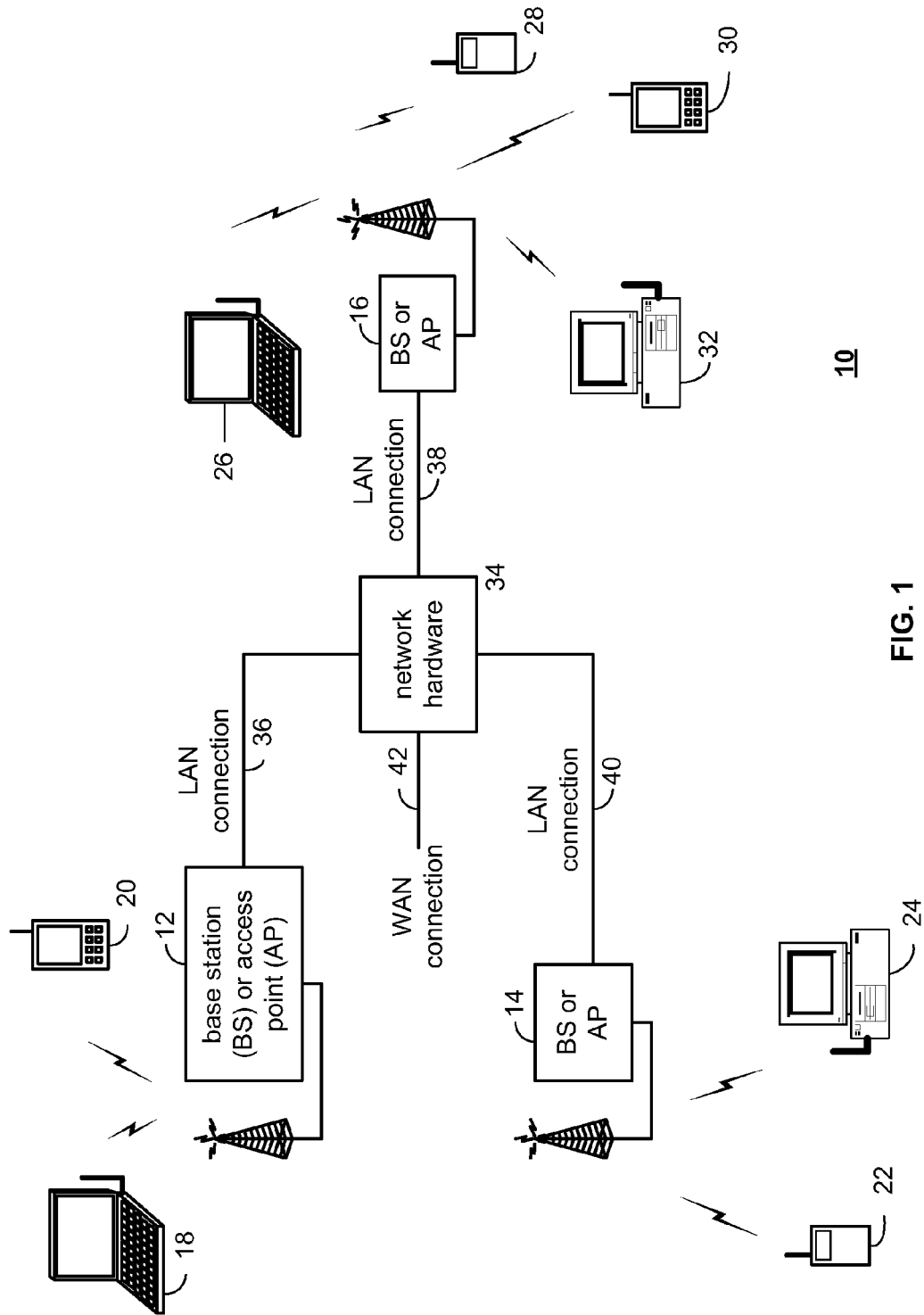
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
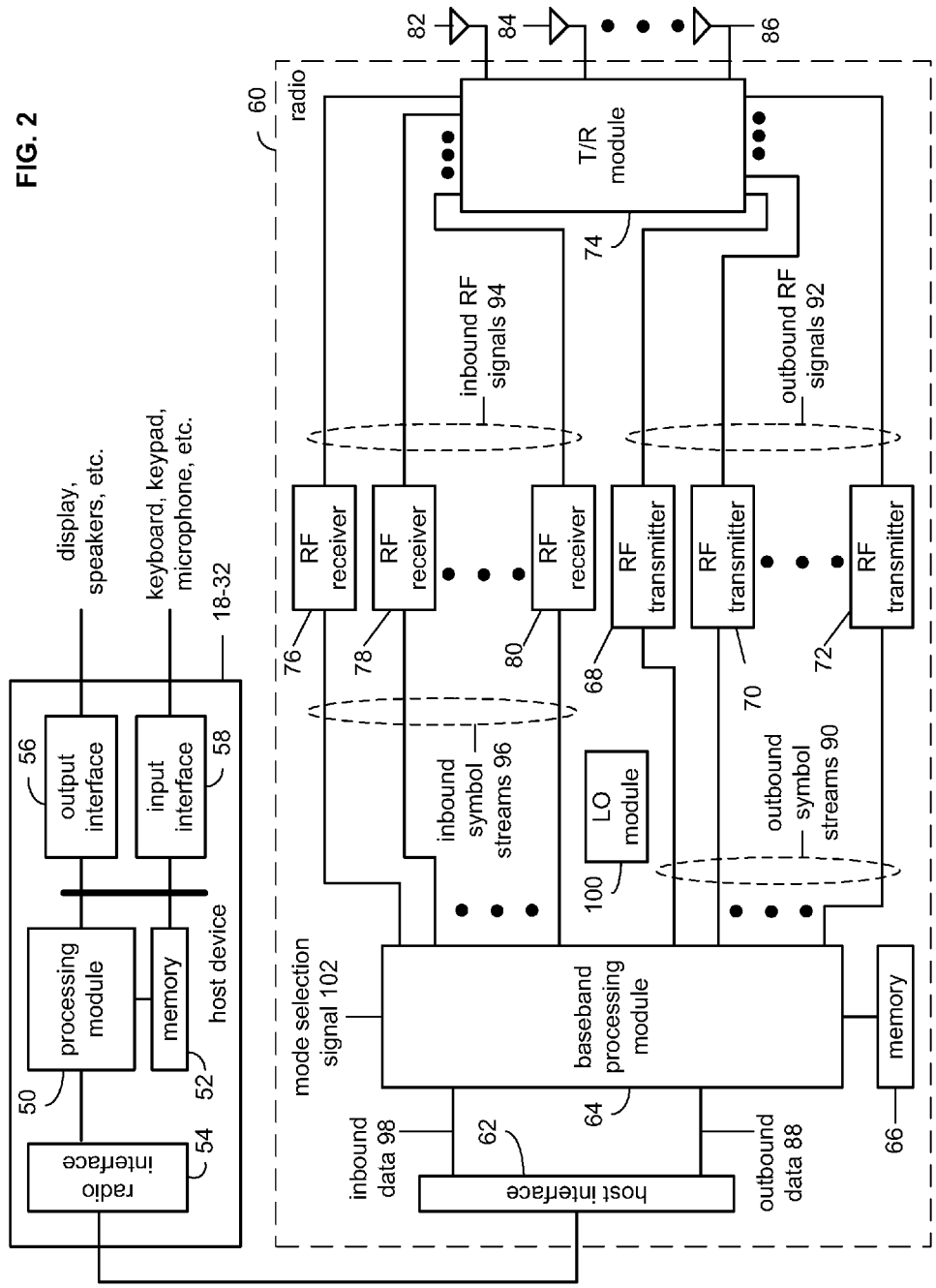
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per sub-carrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
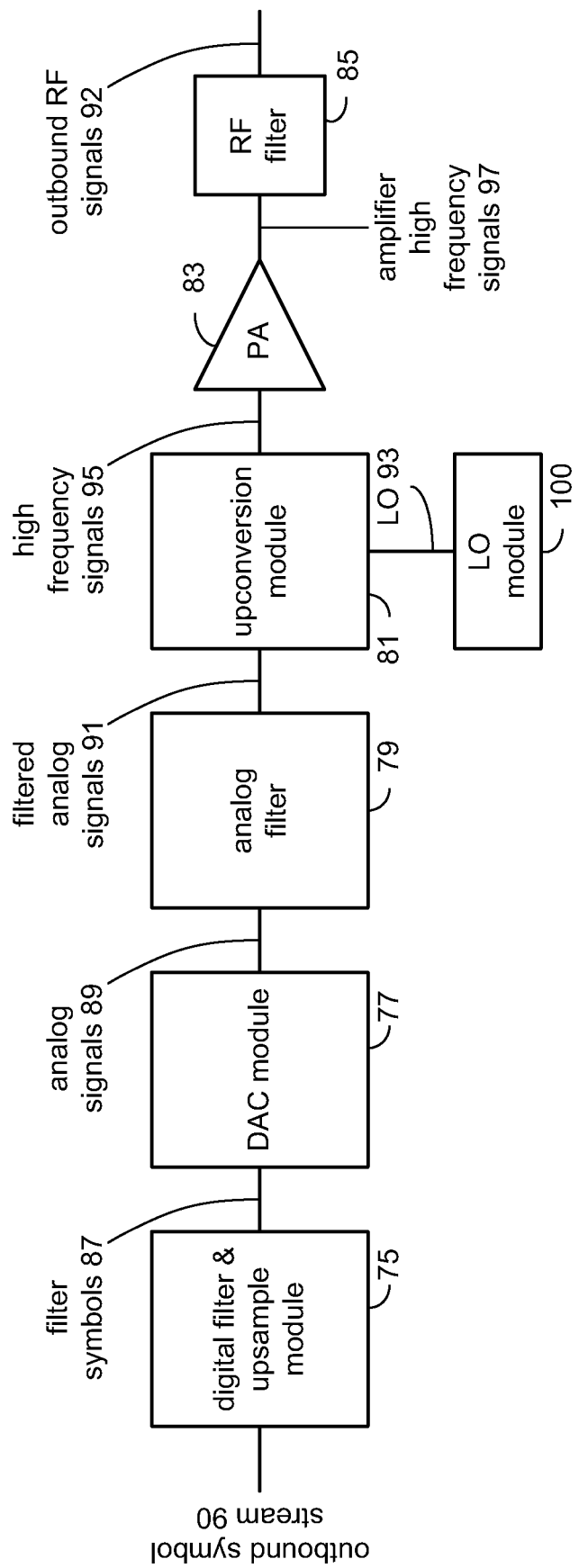
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
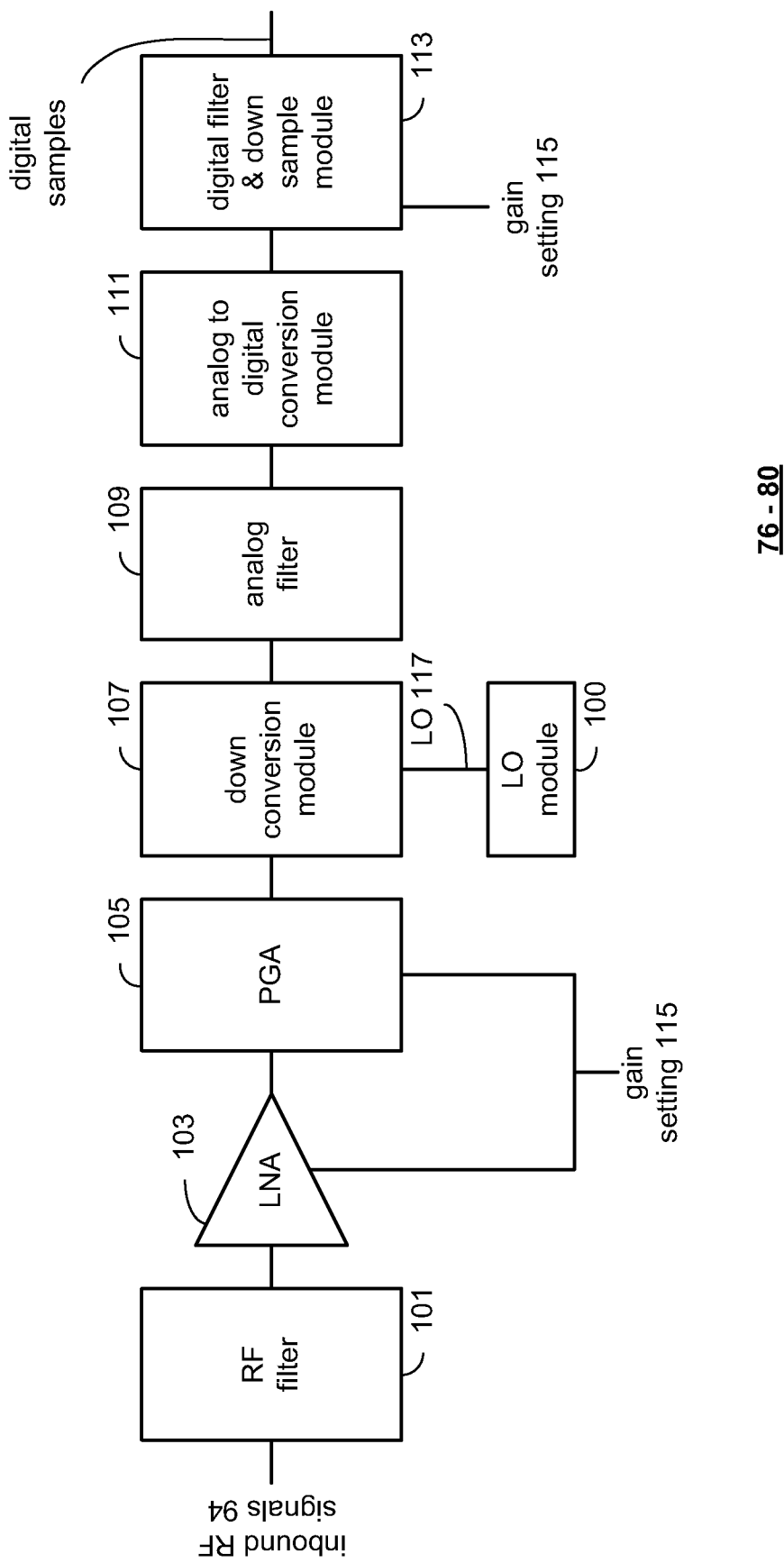
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting 115 and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) signal 117 that is provided by the local oscillation module 100 to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
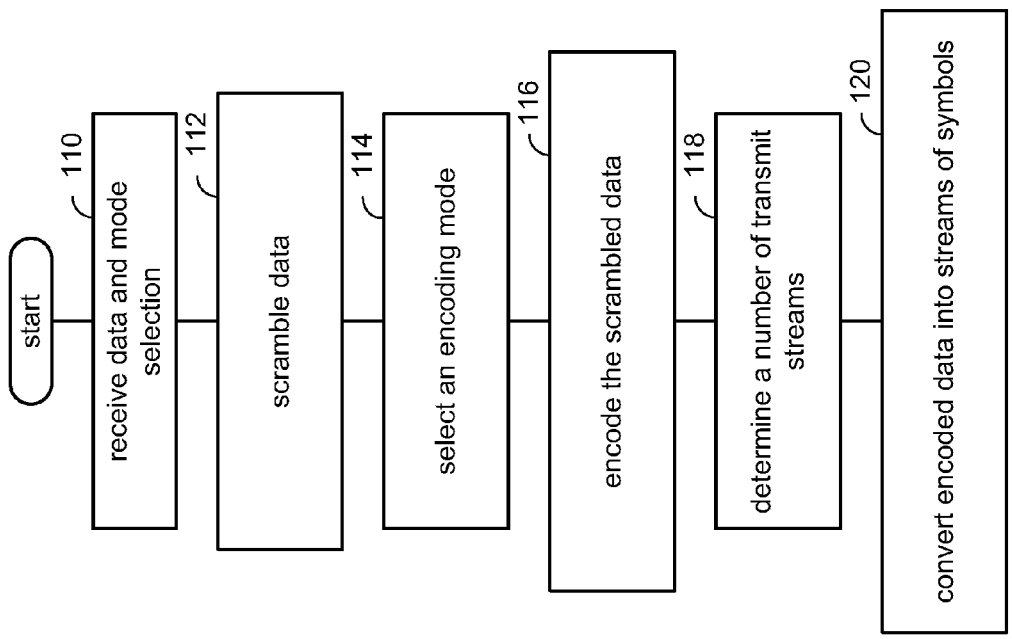
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
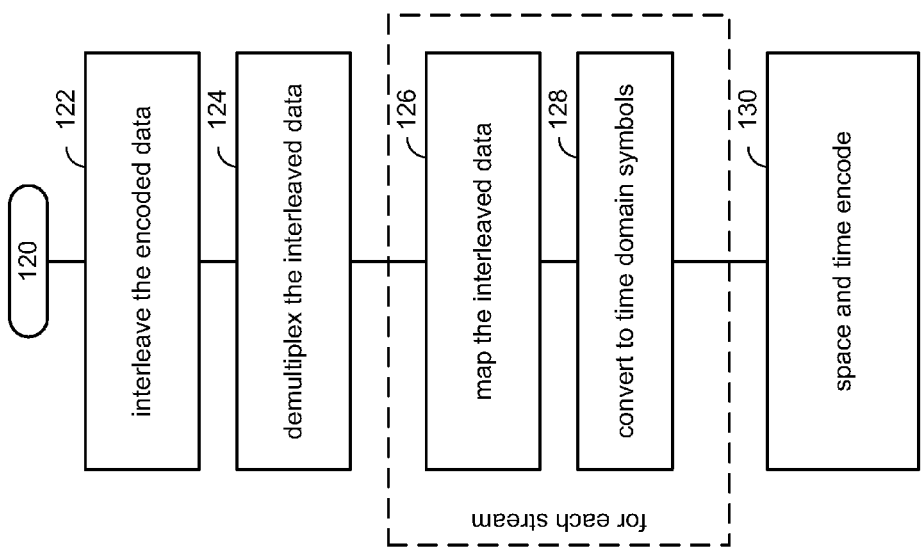
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and sub-carriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
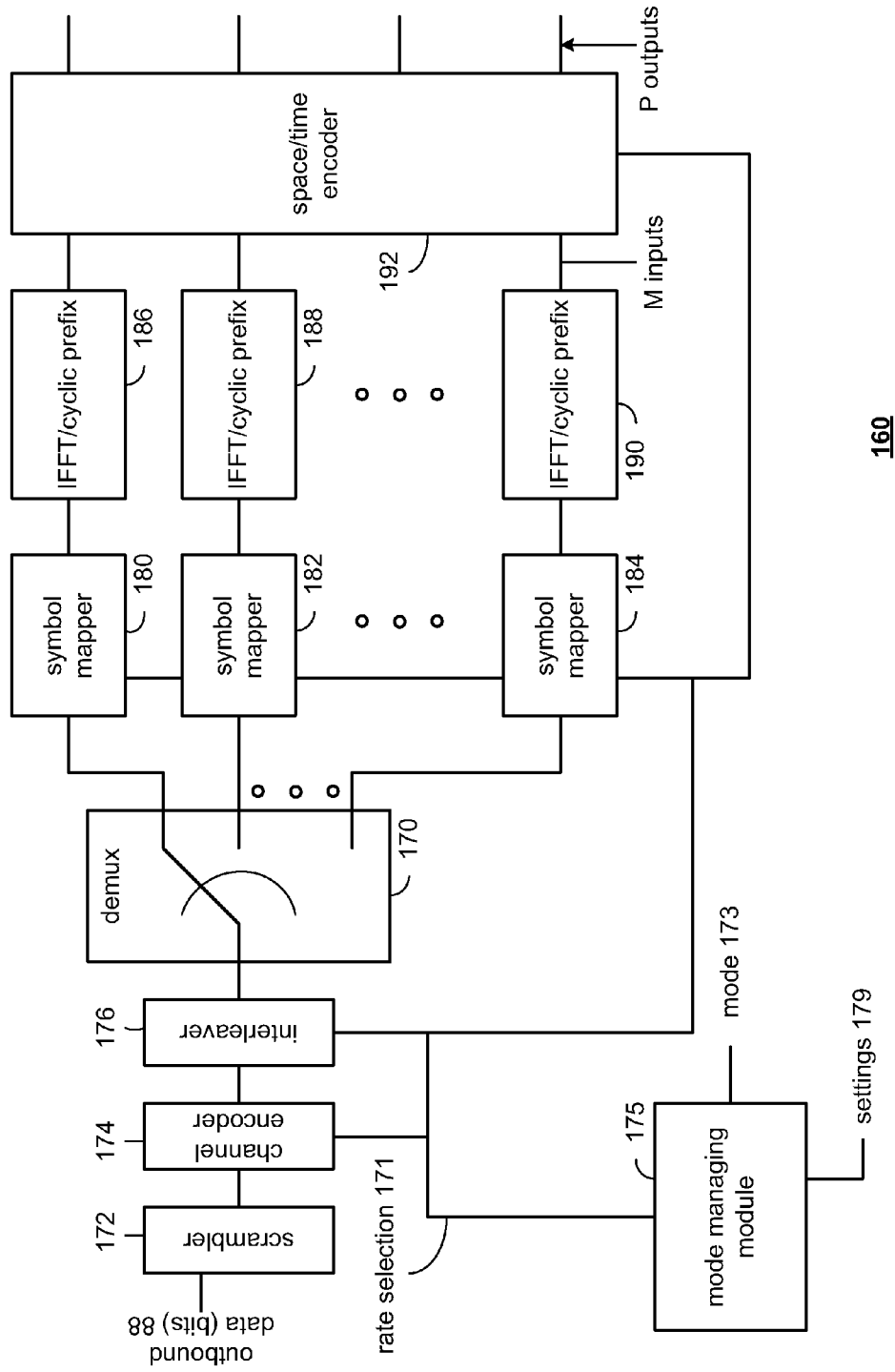
FIGS. 10A and 10B are diagrams illustrating embodiments of a radio transmitter.
Figure 10B:
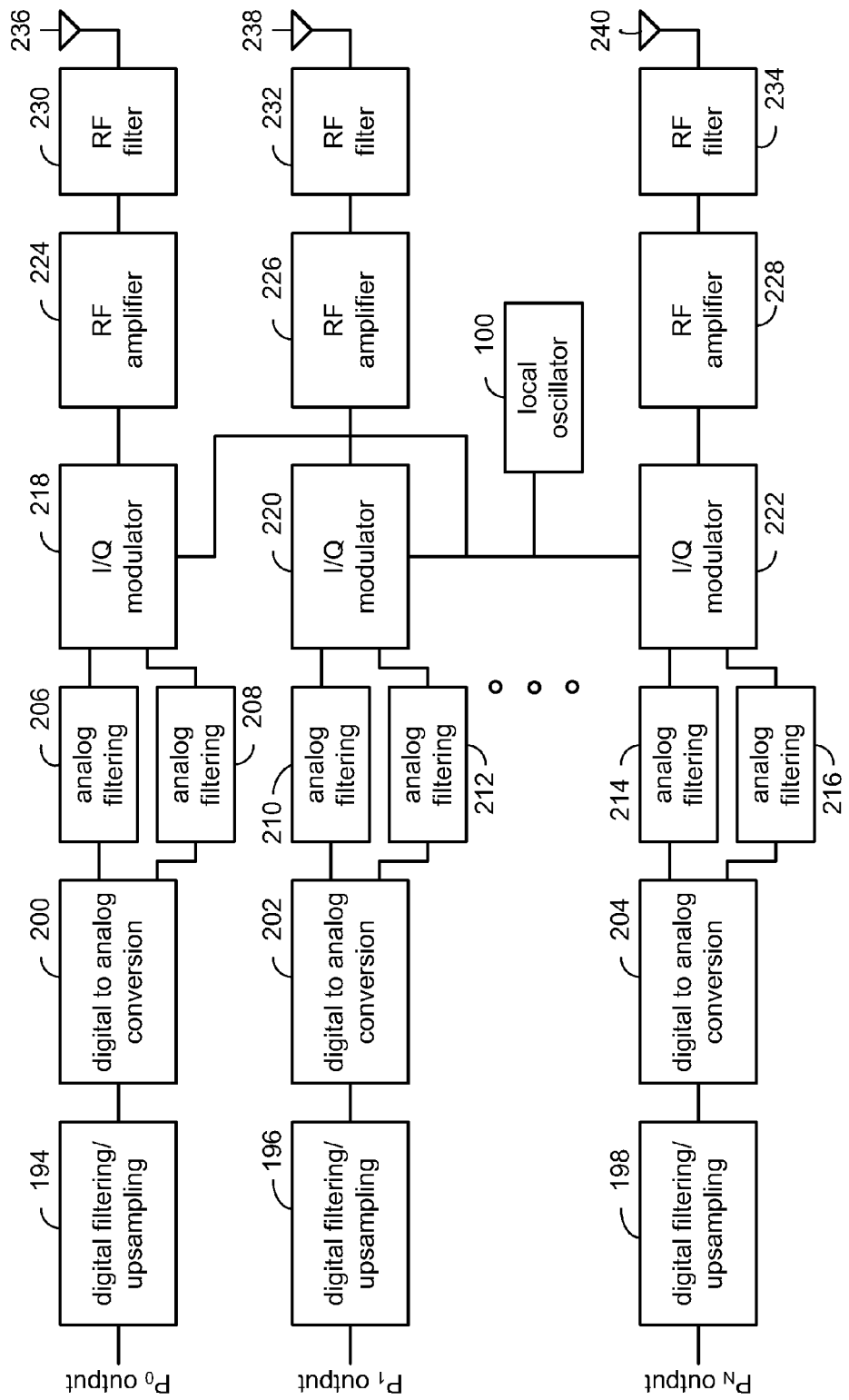

FIGS. 10A and 10B are diagrams illustrating embodiments of a radio transmitter 160. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, etc.) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
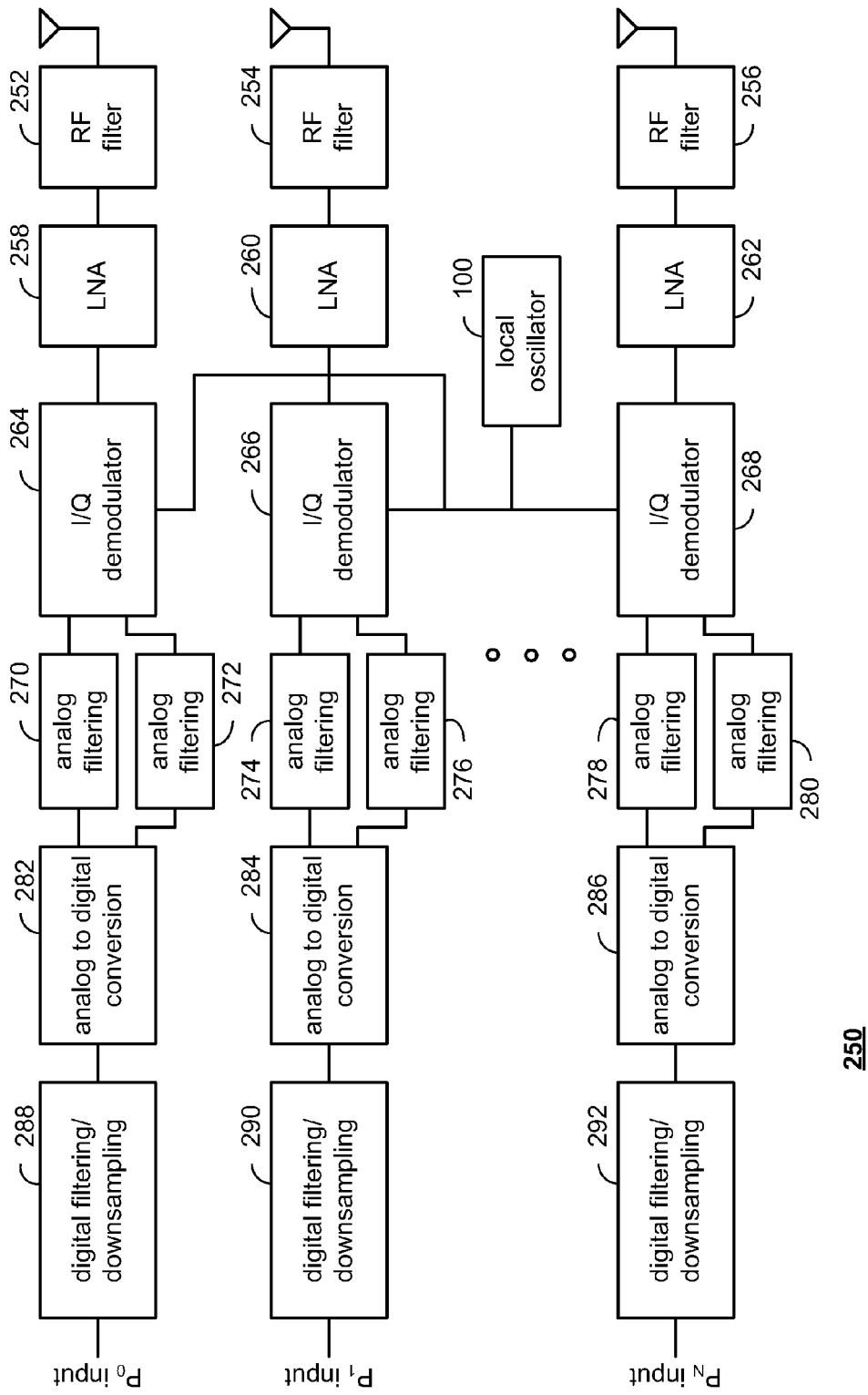
FIGS. 11A and 11B are diagrams illustrating embodiments of a radio receiver.
Figure 11B:
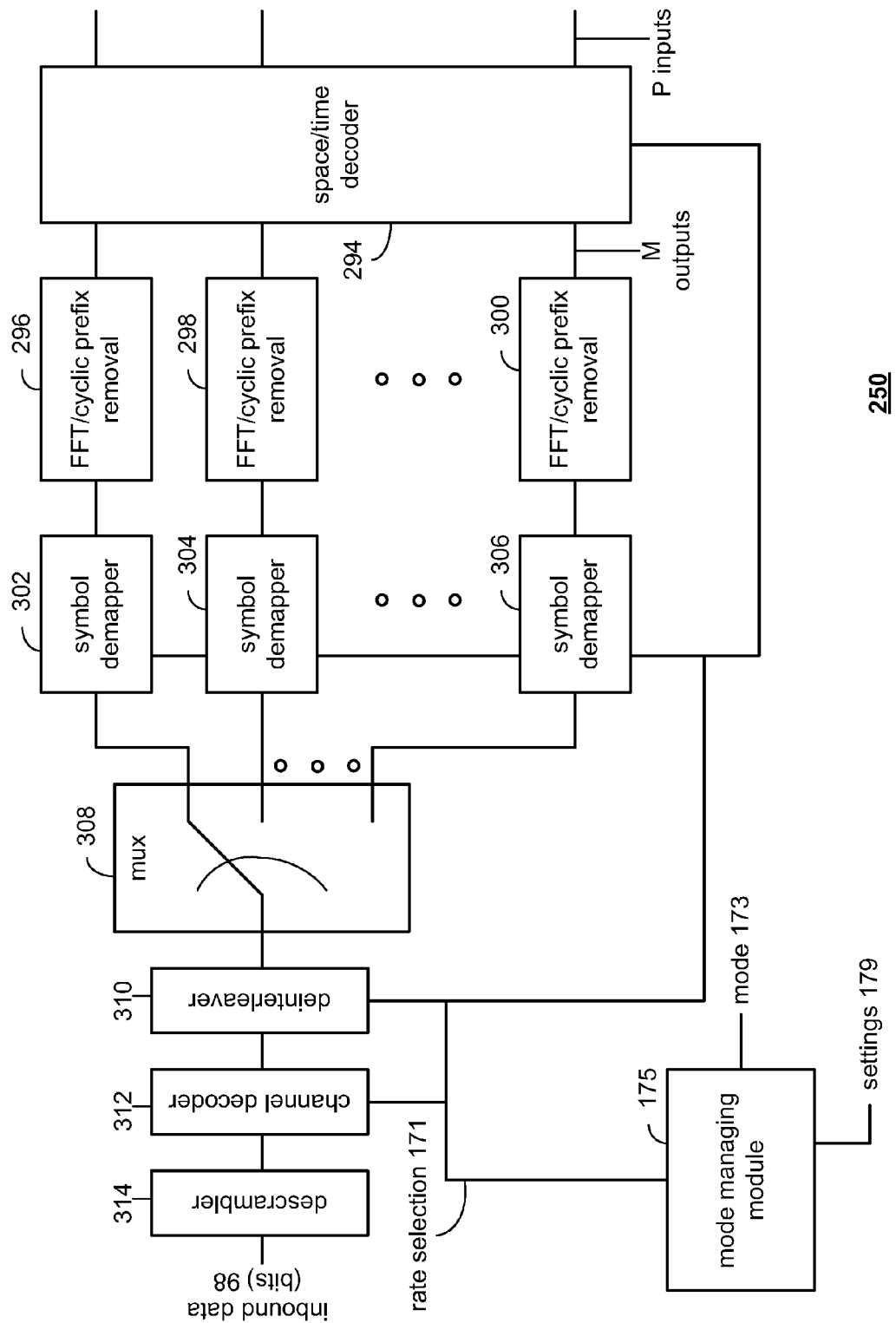

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
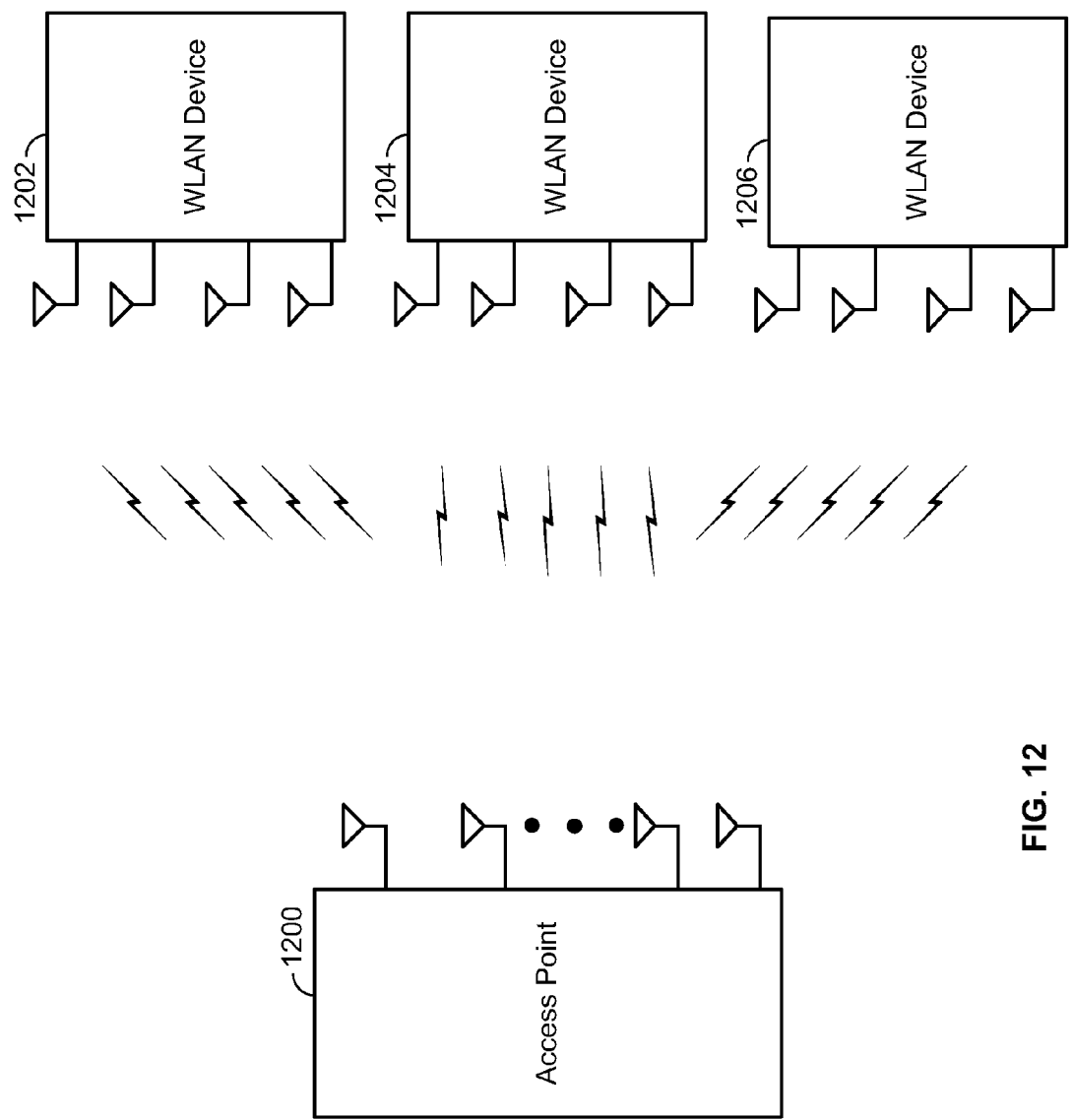
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 13:
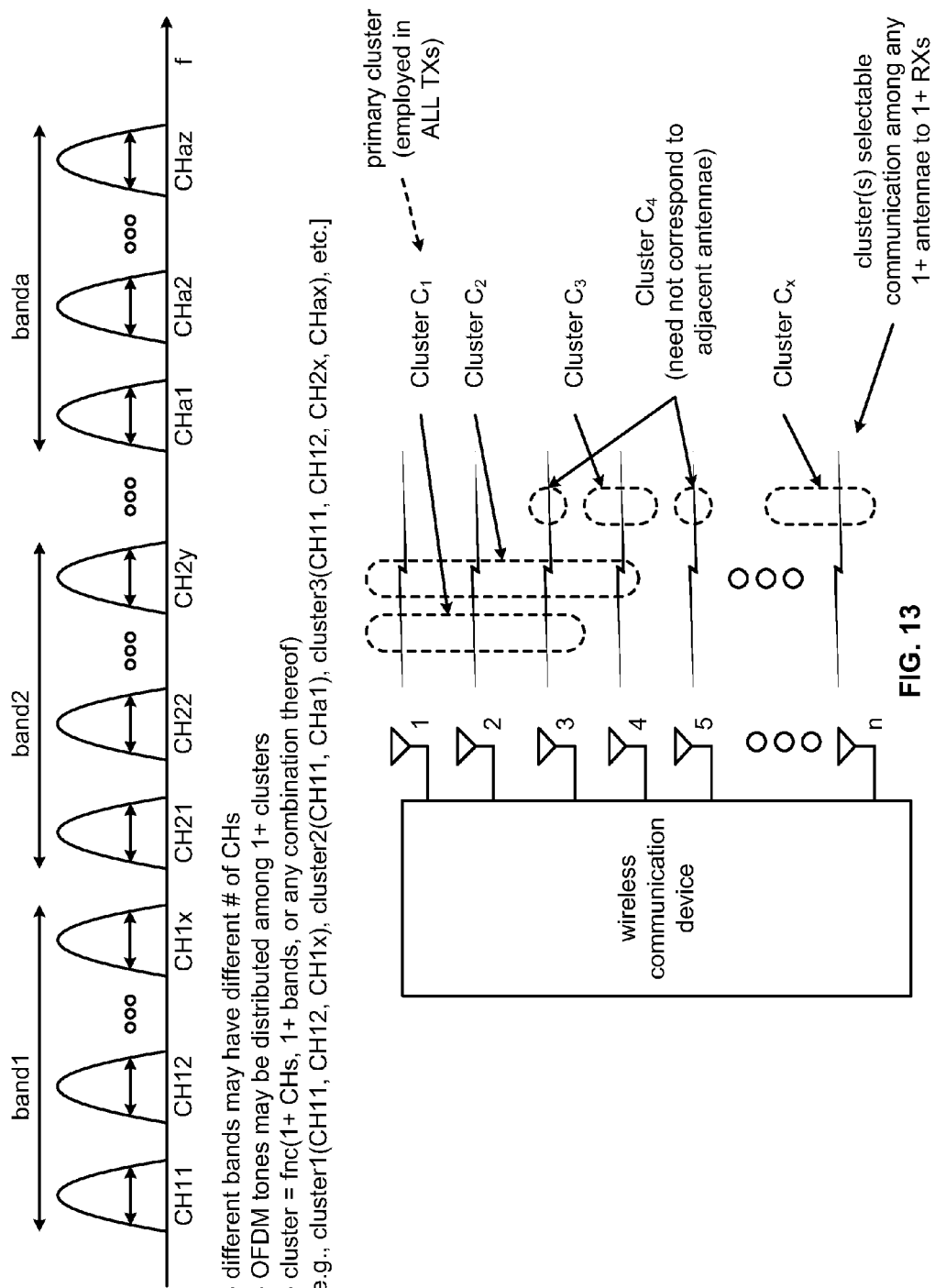
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ad, ae, af, ah, etc.).

Figure 14:
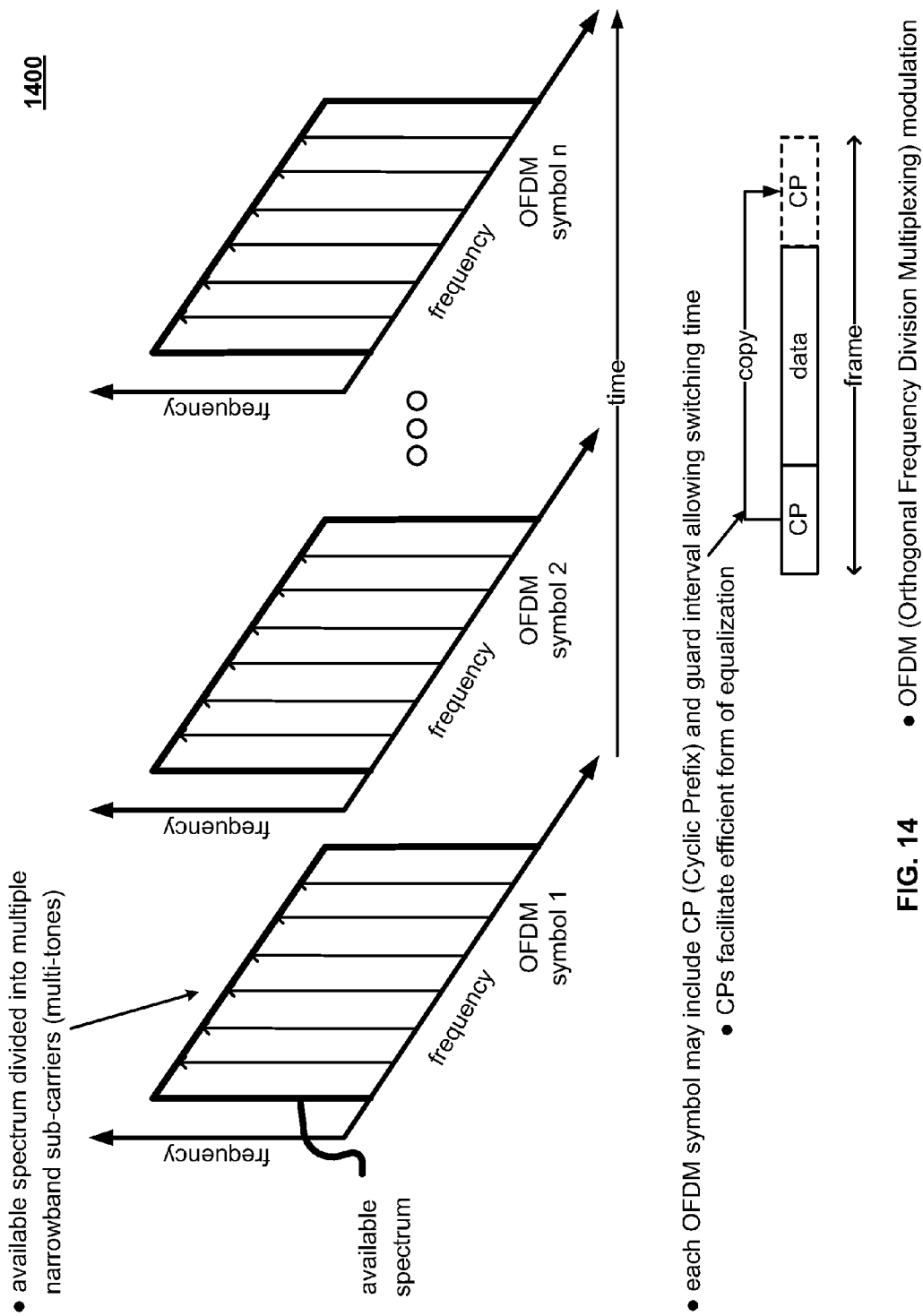
FIG. 14 illustrates an embodiment of OFDM (Orthogonal Frequency Division Multiplexing).

FIG. 14 illustrates an embodiment 1400 of OFDM (Orthogonal Frequency Division Multiplexing). OFDM modulation may be viewed a dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation coding techniques.

OFDM modulation operates by performing simultaneous transmission of a larger number of narrowband carriers (or multi-tones). Oftentimes a guard interval (GI) or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols. Generally speaking, OFDM system design is based on the expected delay spread within the communication system (e.g., the expected delay spread of the communication channel).

Figure 15:
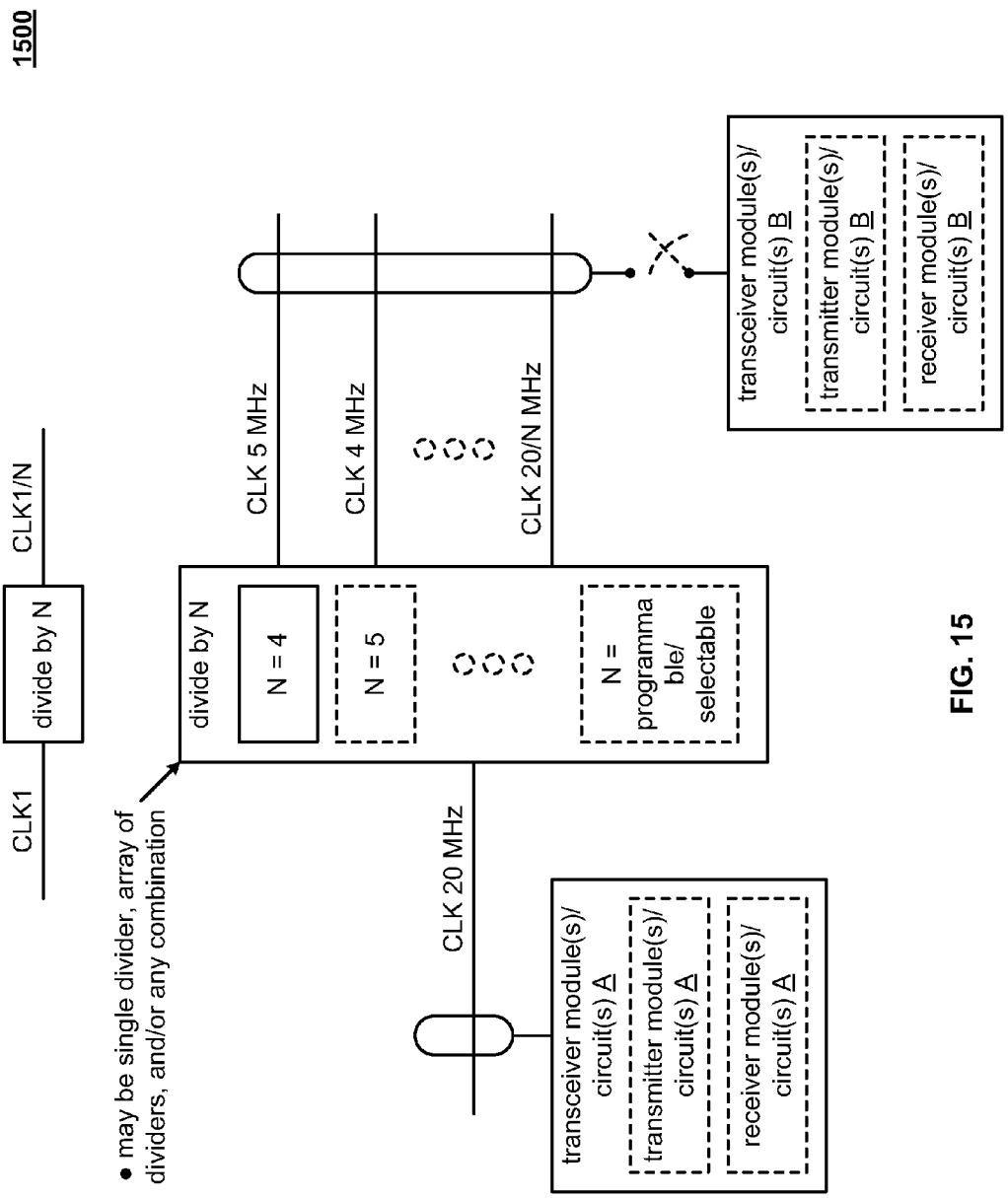
FIG. 15 illustrates an embodiment of down-clocking for by different respective transceiver sections within a communication device.

FIG. 15 illustrates an embodiment 1500 of down-clocking of signals for use by different respective transceiver sections within a communication device. Certain wireless communication devices may be implemented to operate within frequency spectra typically dedicated for use by television channels. For example, TV channels operating in accordance with broadcast television may operate using particular portions of the electromagnetic frequency spectrum. Generally, frequencies associated with UHF and VHF may be employed for broadcast television. However, certain wireless communication devices have capability to operate using some or all of these portions of the frequency spectrum when some or all of these portions of the frequency spectrum are not used for television. For example, selective operation of a wireless communication device may be made based upon whether or not some or all of the portions of the frequency spectrum typically used for broadcast television are in use or not. Generally, portions of the frequency spectrum typically dedicated for such use (e.g., broadcast television) may instead be used for operating wireless communication devices such as in accordance with those operative within wireless local area network (WLAN/WiFi) or other wireless communication systems, networks, etc.

In accordance with providing operation of such wireless communication devices using frequency spectra typically associated with TV channels, care must be made to ensure that operation of such wireless communication devices is on a non-interfering basis with respect to any broadcast TV. For example, while any broadcast TV existent and such portions of the frequency spectrum are given primary or first priority, secondary or second priority may be given for use of such wireless communication device is provided that they can operate on a non-interfering basis with respect to broadcast TV.

In accordance with current rules and guidelines including those provided by the Federal Communications Commission (FCC), there are very strict guidelines by which such wireless communication device operation may be made using those portions of the frequency spectra typically associated with TV channels. For example, based upon operation in accordance with one or more broadcast television channels, a very low spectral mask requirement (e.g., −55 dB attenuation) is required at the respective edge of a 6 MHz channel (e.g., the respective lower and upper frequency band edge boundaries are typically separated by approximately 6 MHz in accordance with TV channels [at least in the United States], such as over the air broadcast channel 2 has a lower edge of 54 MHz and an upper edge of 60 MHz, over the air broadcast channel 3 has a lower edge of 60 MHz and upper edge of 66 MHz, etc. in accordance with VHF low band (band I)).

Typically, operation in accordance with IEEE 802.11x (e.g., where x is a, b, g, n, ac, ad, ae, af, ah, etc.) channels requires that a wireless communication device provide for significantly less attenuation than is required to operate using frequency spectra typically associated with TV channels. Among others, IEEE 802.11 of is a developing standard, protocol, and/or recommended practice directed towards operation of one or more wireless local area networks (WLAN/WiFi) on a secondary, non-interfering basis with respect to broadcast television channels. Generally speaking, broadcast television channels around the world use respective channel bandwidths of particular widths. Considering the United States and some other countries, respective channel bandwidths of 6 MHz are employed. Considering Australia and some other countries, respective channel bandwidths of 7 MHz are employed. Considering various countries in Europe, among others, respective channel bandwidths of 8 MHz are employed. Regardless of the particular channel bandwidth employed in a given application, operation of one or more wireless local area networks (WLAN/WiFi) on a secondary, non-interfering basis may be supported. It is further noted that while certain of the various embodiments and/or diagrams presented herein are directed towards channel bandwidths particularly of 6 MHz, it is noted that any one or more of the various aspects, embodiments, and/or their equivalents, of the invention may generally be adapted and applied towards channel bandwidths of different respective values (e.g., 7 MHz, 8 MHz, and/or any other particular channel bandwidths). That is to say, while certain of the various embodiments and/or diagrams herein are directed towards a preferred an exemplary embodiment of 6 MHz channels, any such aspects, embodiments, and/or their equivalents, of the invention may be applied to any other desired channel bandwidth without departing from the scope and spirit of the invention.

For example, operation of a wireless communication device in accordance with IEEE 802.11x channels may be acceptable while providing an attenuation of approximately −10 dB at the edge of IEEE 802.11x channels. As may be understood, there is a significant spectral mask requirement for operation using frequency spectra typically associate with TV channels (e.g., −55 dB attenuation) in comparison to that which is required in accordance with typical operation in accordance with IEEE 802.11x channels (e.g., −10 dB attenuation). Also, for operation using frequency spectra typically associate with TV channels, there is a power spectral density (PSD) limit on the amount of transmit power that may be used in any given portion of bandwidth (e.g., a PSD limit in any given 100 kHz of bandwidth).

In one possible embodiment, clocking ratio of a desired ratio (e.g., generally, N) is operative to generate any one of a number of different respective channels. For example, considering a 20 MHz channel, down clocking by a value of four would provide for 5 MHz channels which would fit within the specified 6 MHz bandwidth channels of the frequency spectra typically associated with TV channels. Alternatively, considering a 20 MHz channel, down clocking by a value of five would provide for 4 MHz channels which would also fit within the specified 6 MHz bandwidth channels of the frequency spectra typically associated with TV channels. As may be understood, different respective ratios down clocking may be employed for providing four different respective widths of channels which may be particularly designed to fit within the specified 6 MHz bandwidth channels of the frequency spectra typically associated with TV channels. In some embodiments, having relatively narrower channels (e.g., 4 MHz channels in comparison to 5 MHz channels) may be desirable in order to provide for the very low spectral mask requirements needed at the respective edges of a given 6 MHz channel existent within the frequency spectra typically associated with TV channels. Generally speaking, a divide by N processing circuitry, module, functional block, etc. may be implemented to perform such down clocking of a given signal (e.g., such as one having a frequency of 20 MHz, or some other frequency) thereby generating at least one down clocked signal generally having a frequency of 20/N MHz (e.g., or generally some frequency such as M/N MHz, in accordance with performing down clocking of a signal having a frequency of M MHz by a value of N). Such a down clocking value may be programmable and/or selectable as may be desired in different respective embodiments. For example, in certain situations, a wireless communication device may be adaptive in order to select anyone of a number of different respective bandwidth channels based on any of a number of considerations. For example, in one instance, 2 MHz bandwidth channels may be preferable; in another instance, 3 MHz bandwidth channels may be desirable; and yet another instance, 5 MHz channels may be acceptable. Generally, appropriate down clocking of a signal may provide for a signal that can have properties acceptable for use within the specified 6 MHz bandwidth channels of the frequency spectra typically associated with TV channels.

In addition, it is noted that adaptation with respect to the amount of bandwidth within a given channel may be performed. For example, considering a channel bandwidth of a particular width (e.g., 6 MHz), some embodiments may operate by employing a particular amount of bandwidth (e.g., 4 MHz, 5 MHz, etc.) of bandwidth within that given available channel bandwidth (e.g., 6 MHz). Depending upon any of a number of considerations (e.g., spectral mask requirements, attenuation and/or filtering capabilities, operating conditions, changes in operating conditions, environmental considerations, etc.), the particular amount of bandwidth employed within an available channel bandwidth may be modified and/or adapted over time. For example, a first amount of bandwidth within the available channel may be employed at or during a first time, a second amount of bandwidth within the available channel may be employed at ordering a second time, etc. and so on.

In certain embodiments, appropriate dividing down of a signal into respective channels of specified sizes may provide for co-opting the PHY definitions of IEEE 802.11ac (64/128/256/512 size fast Fourier transform (FFT)). For example, as may be seen in the diagram, a first clock having a first frequency (e.g., CLK1) may be divided down by a factor of N to generate a second having a second frequency (e.g., CLK1/N). Generally, a first clock signal having a first frequency (or set of clock signals each having a respective and different first frequency) may be divided down by a factor of N to generate a second clock signal having a second frequency (or a set of clock signals each having a respective and different second frequency).

For example, in one particular embodiment, a first clock has a frequency of 20 MHz and may be divided down by a factor of N (where N may be programmable and/or selectable certain embodiments) to generate a second clock signal having a divided down frequency of 20/N MHz. The different respective first and second clocks may be implemented and operative for use (e.g., such as by the PHY) of a first and second one or more transceiver modules/circuitries within the wireless communication device. For example, the first clock having a frequency of 20 MHz may be employed by a first one or more transceiver modules/circuitries within the wireless communication device, and a second clock having a frequency of 20/N MHz may be employed by a second one or more transceiver modules/circuitries within the wireless communication device.

Each of the respective clocks within the various sets may be selectively provided to different portions of the first/second one or more transceiver modules/circuitries. That is to say, within the first/second clocks, the different clocks therein may be provided to different respective portions of the first/second one or more transceiver module/circuitry (e.g., 20 MHz to a first portion, 20/N MHz to a second portion, etc.). It is of course noted that such respective transceiver modules/circuitries may respectively be implemented as having different respective transmitter and receiver components. In some embodiments, a given communication device may include a singular set of transceiver modules/circuitries, and depending upon the frequency of the clock signal provided thereto, signaling would be generated in accordance with one of any of a number of respective communication protocols, standards, and/or recommended practices. That is to say, when a first clock frequency is employed, signaling may be generated in accordance with a first communication protocol, standard, and/or recommended practice. Then, if a second clock frequency is employed (e.g., such as a down clocked version of the first clock frequency), then signaling may be generated in accordance with a second communication protocol, standard, and/or recommended practice.

Depending upon any one or more of a number of considerations (e.g., current operating conditions, currently existent broadcast TV within one or more of the TV channels, interference, noise, environmental conditions, etc.), one particular frequency of channels may be desirable over one or more other frequencies. Also, depending upon any one or more of such considerations, including those described above, as well as the very stringent spectral mask requirements when operating using portions of the frequency spectra typically associated with TV channels may direct the selection of one particular frequency over others. For example, in certain situations, 4 MHz channels may be suitable and acceptable for effectuating be very stringent required spectral mask at the respective bandages of a 6 MHz channel within the frequency spectra typically associated with TV channels (e.g., a −55 dB attenuation may be able to be achieved at the 6 MHz band edges using 4 MHz channels). In another situation, 5 MHz channels may be suitable and acceptable for effectuating be very stringent required spectral mask at the respective bandages of a 6 MHz channel within the frequency spectra typically associated with TV channels (e.g., a −55 dB attenuation may be able to be achieved at the 6 MHz band edges using 4 MHz channels). However, there may be some situations in which either the design and/or implementation of a given wireless communication device, or the current operating conditions, would require that channels of relatively narrower with be employed. For example, in some situations, relatively narrow channels, such as 2 MHz channels may be the widest channels that may be used while providing for suitable and acceptable operation including complying with the very stringent required spectral mask at the respective bandages of a 6 MHz channel within the frequency spectra typically associated with TV channels (e.g., a −55 dB attenuation may be able to be achieved at the 6 MHz band edges using 4 MHz channels).

As may be understood, when different respective widths are employed using different respective channels, particularly using operation in accordance with OFDM, certain operational modes may provide for different respective numbers of tones and/or sub-carriers to be used. For example, such as with reference to FIG. 14, if the portion of the frequency spectrum employed in accordance with an OFDM symbol is changed, so will the possible and/or available number of tones and/or sub-carriers change.

In one embodiment, in order to provide for an instance in which relatively larger percentages of a 6 MHz TV channel may be used (e.g., comparing and implementation using 5 MHz channels as opposed to 4 MHz channels), additional data sub-carriers may be employed within an alternative operational mode.

Figure 16:
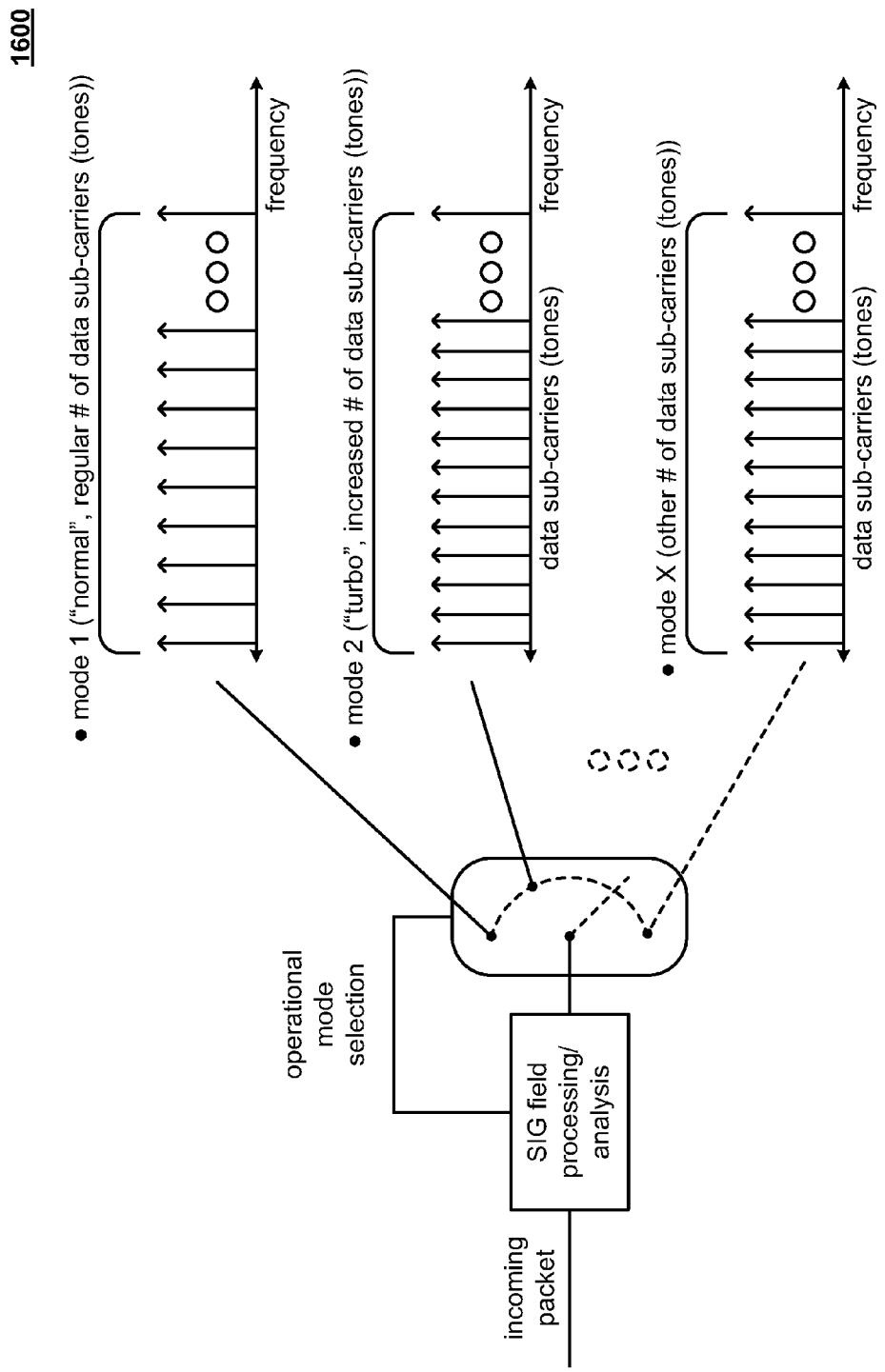
FIG. 16 illustrates an embodiment of selective mode operation based on signal (SIG) field processing/analysis of a packet within a communication device.

FIG. 16 illustrates an embodiment 1600 of selective mode operation based on signal (SIG) field processing/analysis of a packet within a communication device. For example, based upon processing of an incoming packet, such as may be performed within a receiver wireless communication device or within the receiver portion of a transceiver wireless communication device, analysis of the signal (SIG) field of such a packet may be made to determine that operational mode by which at least one other portion of the packet is to be processed. For example, different numbers of data sub-carriers may be used within different respective packets employed for transmission using different respective channels of different respective widths. In one embodiment, a regular or normal number of data sub-carriers is employed in accordance with an operational mode 1, and an increased or larger number of data sub-carriers is employed accordance with an operational mode 2 (e.g., which may be referred to as a turbo mode).

Generally, any of a number of different operational modes may be employed each having different respective numbers of data sub-carriers. For example, distinction between at least two operational modes may be made or declared in a capability bit included within the signal (SIG) field a packet. It is further noted that such a capability bit may be included within any other desired portion of a communication between communication devices to indicate the respective capability of a given communication device. For example, a given communication device may provide indication to one or more other communication devices regarding its respective capability in terms of generating and/or processing packets, signals, etc. having more than one respective number of data sub-carriers are tones. Appropriate coordination between different respective communication devices may be made such that communications may effectively and/or adaptively employ a desired number of data sub-carriers are tones.

As may be understood, if more than two operational modes are desired to be distinguished, more than one capability bit maybe appropriately included within the signal (SIG) field a packet. Certain portions of a preamble of a packet, including the signal (SIG) field, may be readily processed and analyzed by any of a number of types of wireless dedication devices having respective capabilities. For example, in an embodiment including a number of different wireless communication devices each having different and respective capabilities and/or at least one wireless communication device having more than one capability, analysis of the signal (SIG) field a packet will direct the manner by which at least one other portion of the packet is to be processed. In one embodiment, different respective numbers of data sub-carriers may be associated with at least one other portion of the packet, and this information may be ascertained by one or more capability bits included within the signal (SIG) field a packet.

It is also noted that down clocking by certain ratios may be preferable over others. For example, down clocking a clock having a frequency of 20 MHz by a ratio of 4 (e.g., thereby generating 5 MHz channels) may not be fully backward compatible to wireless communication devices that implement down clocking the clock having a frequency of 20 MHz by a ratio of 5 (e.g., thereby generating 4 MHz channels) since the bandwidth occupied within the different respective channels is different and the tone spacing may be different. In such instances, correct demodulation of a 5 MHz waveform may not necessarily be possible by a wireless communication device designed and implemented to operate on a 4 MHz waveform. However, it is noted that different respective circuitry portions of a wireless communication device may be implemented such that a first circuitry portions may be selected and employed when using down clocking by a first ratio, a second circuitry portion may be selected and employed when using down clocking by a second ratio, and so on. That is to say, in certain embodiments, provisioning different respective circuitry portions for handling different respective down clocking ratios may be used to allow correct demodulation of waveforms having different respective frequencies. Alternatively, such programmable, adaptable, and/or configurable circuitry within a wireless communication device may be implemented for handling different respective down clocking ratios thereby allowing for correct demodulation of waveforms having different respective frequencies.

As may be understood, regardless of a particular operational mode being employed, the signal (SIG) field of the packet may be implemented to be the same or unchanged, so that any of a number or all of the wireless communication devices within such a wireless communication system, network, etc. will be able to determine the operational mode associated with a given packet. For example, regardless of the operational mode, the tone location and spacing in the signal (SIG) field of the packet will be unchanged. That is to say, the location and structure of the tones and the respective spacing, etc. within the signal (SIG) field of the packet will be the same regardless of the operational mode associated with at least one other portion of the packet.

When operating within an operational mode other than a normal or regular operational mode, the number of data sub-carriers may be changed. For example, when operating in accordance with a mode 2 (e.g., "turbo"), the number of data sub-carriers may be increased such that data sub-carriers are added to other fields on the left and right hand side of a given signal waveform so that it remains symmetric around a given frequency (e.g., baseband, DC, etc.). In one embodiment, 25% more data sub-carriers may be added to increase a signal bandwidth effectively from 4 MHz to 5 MHz. In another embodiment, approximately 66% more sub-carriers may be added to increase a signal bandwidth effectively from 3 MHz to 5 MHz. In yet another embodiment, approximately 33% more sub-carriers may be added to increase a signal bandwidth effectively from 3 MHz to 4 MHz. Generally, any desired modification and/or change of numbers of sub-carriers are tones may be made in various embodiments. For example, modification from a first bandwidth to a second bandwidth may be made in accordance with any desired increment, step, percentage change, etc.

Moreover, generally, when transitioning from a first bandwidth channel to a second bandwidth channel being relatively wider than the first bandwidth channel, data sub-carriers may be added to increase the signal bandwidth accordingly. Alternatively, when transitioning from a first bandwidth channel to a second bandwidth channel being relatively narrower than the first bandwidth channel, data sub-carriers may be removed to decrease the signal bandwidth accordingly.

As may be understood, appropriate processing and/or analysis of the signal (SIG) field of a packet will indicate the corresponding operational mode associated with a packet. For example, a transmitter communication device can include information within a packet's SIG field to indicate to a receiver communication device the number of sub-carriers are tones therein (e.g., the number of data sub-carriers are tones within the packet). In one embodiment, such processing and/or analysis of the signal (SIG) field of the packet will indicate whether the packet is compliant in accordance with operational mode 1 (e.g., normal or regular number of data sub-carriers) or mode 2 (e.g., turbo mode having an increased number of data sub-carriers). It is of course also noted that more than two different respective operational modes may be employed in certain embodiments, and different respective numbers of data sub-carriers may be employed in different respective modes. Again, because the location and structure of the tones and the respective spacing, etc. within the signal (SIG) field of the packet will be the same regardless of the operational mode associated with at least one other portion of the packet, more than one and ideally all of the wireless communication devices within a given wireless communication system, network, etc. will be able to determine the operational mode associated with a given packet. In most embodiments, all of the respective communication devices within the WLAN will be able to hear, understand, demodulate, decode, process, etc. the SIG field of any respective packet.

In some instances, consideration may be made with respect to the size of fast Fourier transform (FFT) employed. Given that the number of occupied tones may vary between different respective operational modes, a different respective sized FFT may be employed appropriately based upon the number of occupied tones. For example, as the number of occupied tones increases by a particular amount, a relatively larger sized FFT may be desirable. Considering one particular embodiment, such as operating in accordance with a 64 FFT mode, the number of occupied tones may increase from 56 to 70. In another instance, such as operating in accordance with a 128 FFT mode, the number of occupied tones may increase from 114 to 130. In such a situation, the relatively larger FFT size, namely, 128 FFT, may be used (e.g., for example, increasing from a 64 FFT size to a 128 FFT size, increasing from eight 128 FFT size to 856 FFT size, etc.).

As may be understood, different respective sizes of FFT and different respective numbers may be employed depending upon the desired width of a given channel associated with a given operational mode. For example, when operating in accordance with the mode 2 (e.g., turbo mode having an increased number of data sub-carriers) described above, an appropriate selected and sized FFT having an appropriate number may be used based upon the relative increase of bandwidth associated with that operational mode.

With respect to operation within at least two respective operational modes, such implementation may be optional or mandatory on the receiver end of the communication channel. For example, within a receiver wireless communication device or within the receiver portion of a transceiver wireless communication device, such implementation and support of two or more respective operational modes may be optional or mandatory. That is to say, not all wireless communication devices within a given wireless communication system, network etc. need necessarily have these very same capability in order to accommodate two or more operational modes. For example, those particular wireless communication devices not having such capability implemented therein (e.g., to support at least two respective operational modes) may simply discard those packets indicated as being anything other than being normal or regular and including an expected/fixed number of data sub-carriers associated with, for example, operational mode 1 (e.g., normal or regular number of data sub-carriers) described above.

Again, it is noted that while various embodiments and/or diagrams herein are directed towards channel bandwidths of a particular width (e.g., 6 MHz, 7 MHz, 8 MHz, etc. or any other desired channel bandwidth), any one or more of the various aspects, embodiments, and/or their equivalents, of the invention may be adapted towards any desired baseline signal or channel bandwidth.

Figure 17:
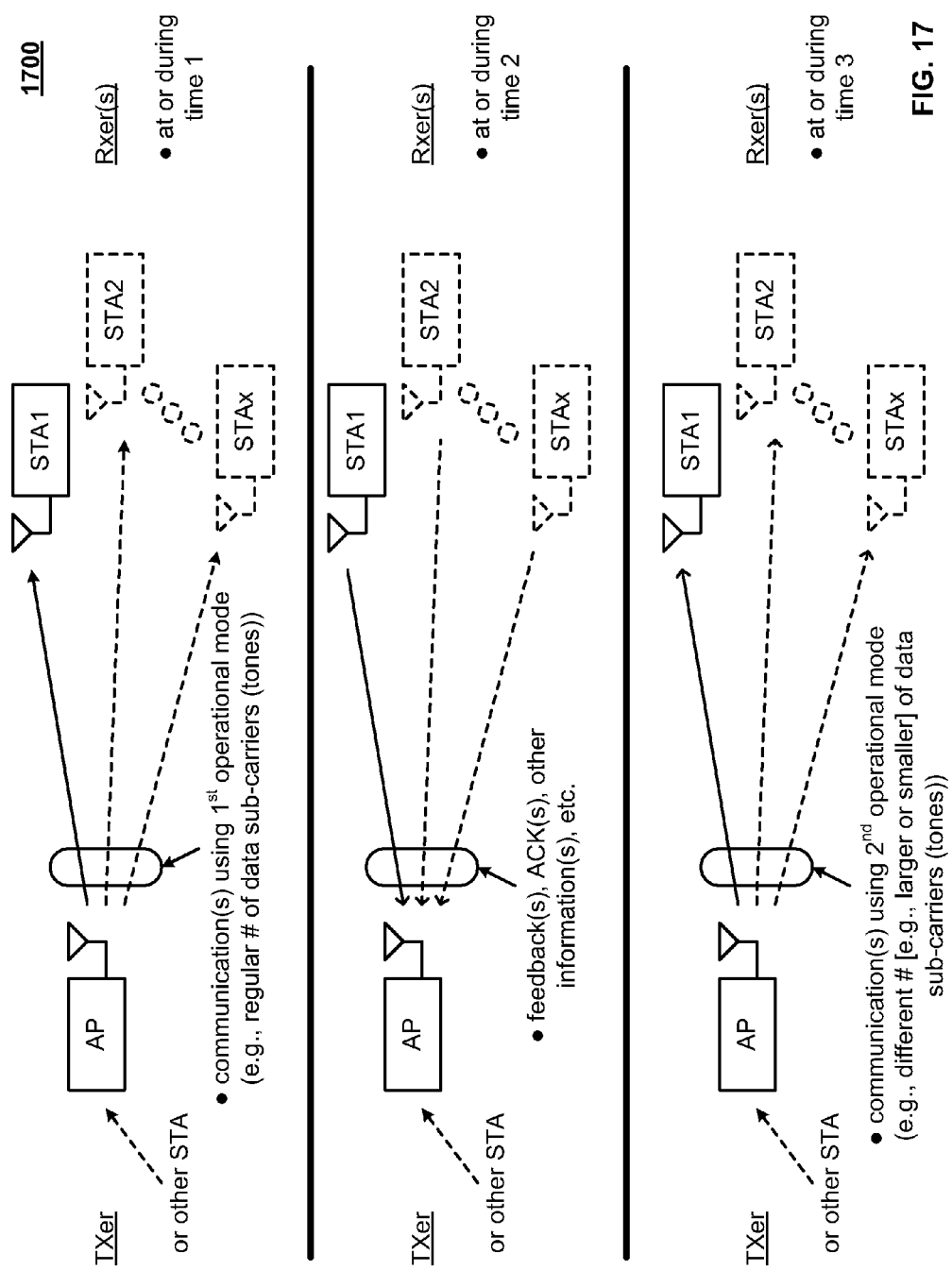
FIG. 17 illustrates an embodiment of adaptation and communications between two or more communication devices.

FIG. 17 illustrates an embodiment 1700 of adaptation and communications between two or more communication devices. Generally speaking, this diagram shows an exemplary embodiment of a WLAN including an access point (AP) and one or more wireless stations (STAs). It is of course noted that alternative embodiments of such a WLAN may include a number of STA's. Also, in some embodiments, communications may be made respectively between STA's.

As may be seen with respect to this diagram, one or more communications are provided from one communication device to one or more other communication devices in accordance with a first operational mode at or during a first time. For example, this first operational mode may correspond to a first number of data sub-carriers or tones. In some embodiments, this first number of data sub-carriers or tones may correspond to a regular number of data sub-carriers or tones. Subsequently, such as at or during a second time, one or more signals are provided from one or more of the receiver communication devices to the transmitter communication device. Such signals may be implemented in accordance with any of a number of embodiments including providing feedback, acknowledgments, other information, etc.

Based upon one or more of these received signals, the original transmitter communication device may provide one or more other communications to the one or more receiver communication devices in accordance with a second operational mode at or during a third time. That is to say, based upon information provided from one or more of the receiver communication devices, the transmitter communication device may adapt its respective operational mode to a different respective operational mode. For example, the second operational mode may correspond to a second number of data sub-carriers or tones. In some embodiments, this second number of data sub-carriers are tones may correspond to a different number (e.g., larger or smaller) of data sub-carriers or tones. As may be understood with respect to other embodiments and/or diagrams herein, such a second operational mode may correspond to a turbo mode.

In addition, it is noted that adaptation between different respective operational modes need not necessarily be based upon information provided from one or more receiver communication devices. That is to say, in some embodiments, adaptation between at least two respective operational modes may be made independently by a transmitter communication device without being directed by or based upon information provided from one or more receiver communication devices. Moreover, the respective manner of adaptation may also vary over time. For example, during a first period of time, adaptation may be made between different respective operational modes independently by the transmitter communication device without being directed by or based upon information provided from one or more receiver communication devices. Subsequently, during a second period of time, adaptation may be made between different respective operational modes in accordance with direction provided by or based upon information provided from one or more receiver communication devices. That is to say, adaptation between different respective operational modes may be very at different respective times.

Figure 18:
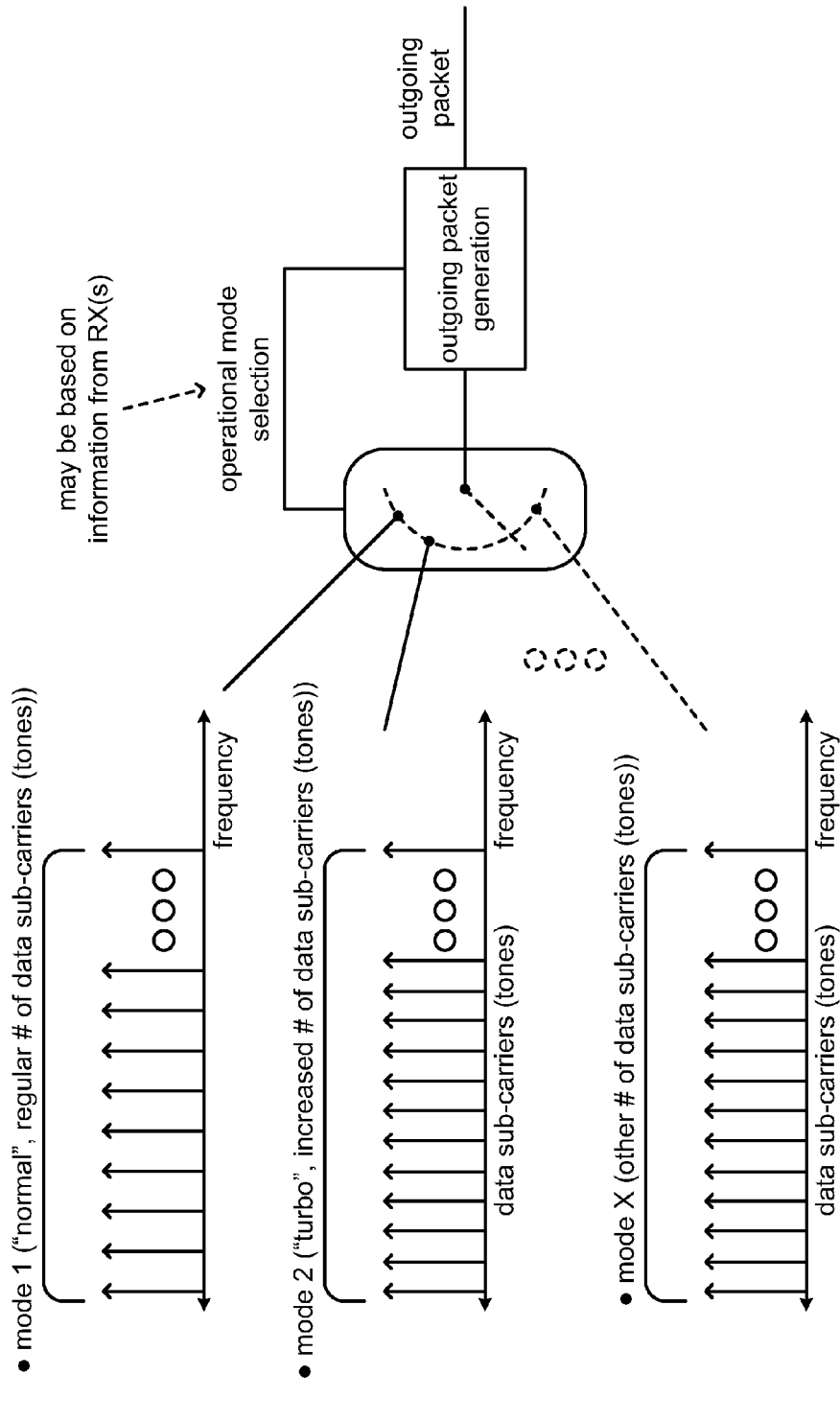
FIG. 18 illustrates an embodiment of selective mode operation and packet generation within a communication device.

FIG. 18 illustrates an embodiment 1800 of selective mode operation and packet generation within a communication device. With respect to this diagram, outgoing packet generation is shown as being performed in accordance with any one of a number of different respective operational modes. With respect to comparison between this diagram and the embodiment 1600 of FIG. 16, this diagram operates in accordance with transmitter or encoder side processing and operation. That is to say, different respective packets may be generated in accordance with different respective operational modes. The adaptation and/or selection between the different respective operational modes may be made, in some embodiments, based upon one or more types of information provided from one or more receiver communication devices. In certain other embodiments, adaptation and/or selection between the different respective operational modes may be made independently by a transmitter communication device.

Generally speaking, the number of operational modes supported by a transmitter communication device may correspond to the number of operational modes supported by one or more receiver communication devices with which the transmitter communication device communicates within a given communication system.

FIG. 19A, FIG. 19B, FIG. 20A, and FIG. 20B are diagrams illustrating embodiments of methods for operating one or more wireless communication devices.

Figure 19B:
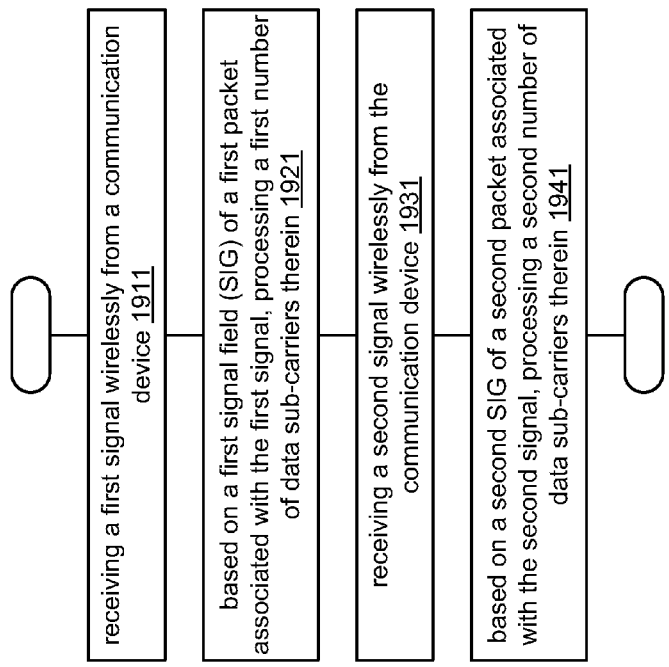
Figure 19A:
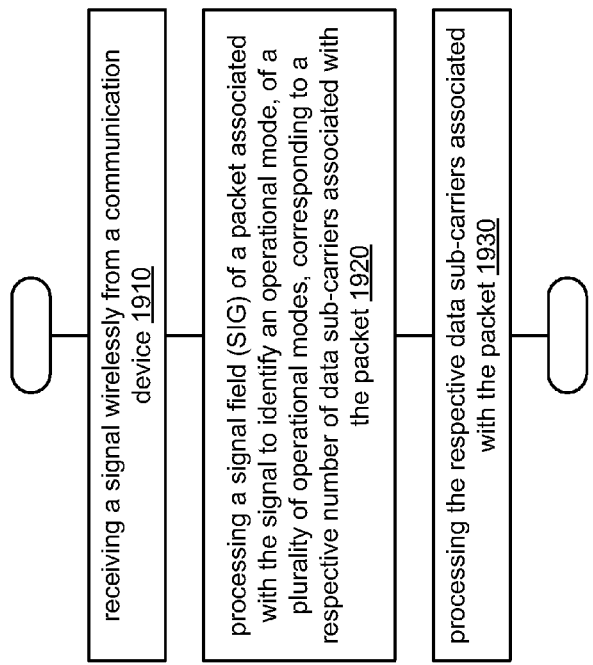

Referring to method 1900 of FIG. 19A, the method 1900 begins by receiving a signal wirelessly from a communication device, as shown in a block 1910. The method 1900 then operates by processing a signal field (SIG) of a packet associated with the signal to the identify an operational mode corresponding to a respective number of data sub-carriers associated with the packet, as shown in a block 1920. The identified operational mode may be one of a number of respective possible operational modes. It is noted that different respective packets may have different respective numbers of data sub-carriers therein. The method 1900 then operates by processing the respective data sub-carriers associated with the packet, as shown in a block 1930.

Referring to method 1901 of FIG. 19B, the method 1901 begins by receiving a first signal wirelessly from a communication device, as shown in a block 1911. Based on a first signal field (SIG) of a first packet associated with the first signal, the method 1901 operates by processing a first number of data sub-carriers therein, as shown in a block 1921.

Then, the method 1901 operates by receiving a second signal wirelessly from the communication device, as shown in a block 1931. Based on a second SIG of a second packet associated with the second signal, the method 1901 operates by processing a second number of data sub-carriers therein, as shown in a block 1941.

As may be understood, different respective packets within a given signal or within different respective signals may have different respective numbers of data sub-carriers or tones therein.

From certain perspectives, the operations associated with the methods 1900 and 1901 may generally be viewed as being performed within a transmitter communication device.

Referring to method 2000 of FIG. 20A, the method 2000 begins by transmitting a first signal wirelessly to a communication device in accordance with a first operational mode, as shown in a block 2010. In some embodiments, the first operational mode may correspond to a "normal" or regular number of data sub-carriers or tones. Then, the method 2000 operates by receiving a second signal wirelessly from the communication device, as shown in a block 2020. This second signal may include any of a number of different types of information including feedback, acknowledgment, other information, etc.

Subsequently, the method 2000 operates by generating a third signal in accordance with a second operational mode based on the second signal, as shown in a block 2030. That is to say, based on one or more indications and/or information within the second signal, the method 2000 operates by generating a third signal in accordance with a second operational mode that is different from the first operational mode. In some embodiments, the second operational mode may correspond to a "turbo" or increased number of data sub-carriers or tones. The method 2000 then operates by transmitting the third signal wirelessly to the communication device, as shown in a block 2040.

From certain perspectives, the operations associated with the method 2000 may generally be viewed as being performed within a transmitter communication device.

Referring to method 2001 of FIG. 20B, the method 2001 begins by receiving one or more first signals wirelessly from at least one communication device, as shown in a block 2011. The method 2001 then operates by identifying at least one capability bit within the one or more first signals indicating capability of at least one of the communication devices, as shown in a block 2021. In some embodiments, each respective capability bit received will correspond respectively to one of the communication devices.

Then, based on the at least one capability that, the method 2001 operates by generating one or more second signals in accordance with one or more operational modes corresponding to the at least one capability bit, as shown in a block 2031. In some embodiments, the respective capability bits associated with the different respective communication devices are all of the same value, and only a singular operational mode may be employed in accordance with generating one or more second signals to be provided to one or more other communication devices. Alternatively, when the respective capability the bits associated with the different respective communication device is are of differing values, then more than one respective operational mode may be employed in accordance with generating one or more second signals to be provided to the one or more other communication devices. Thereafter, the method 2001 operates by transmitting the one or more second signals wirelessly to the at least one communication device, as shown in a block 2041.

It is noted that while various embodiments and/or diagrams herein are described with reference to a single capability bit indicating one of two possible respective operational modes. Of course, it is noted that alternative embodiments may employ more than one respective capability bit (e.g., a plurality of capability bits) to indicate distinction between more than two possible respective operational modes without departing from the scope and spirit of the invention.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|------|------------|-----------|-------|-------|-------|-----|-------------|-----|------|
| 1    | Barker BPSK |          |       |       |       |     |             |     |      |
| 2    | Barker QPSK |          |       |       |       |     |             |     |      |
| 5.5  | CCK        |           |       |       |       |     |             |     |      |
| 6    | BPSK       | 0.5       | 1     | 48    | 24    | −5  | −82         | 16  | 32   |
| 9    | BPSK       | 0.75      | 1     | 48    | 36    | −8  | −81         | 15  | 31   |
| 11   | CCK        |           |       |       |       |     |             |     |      |
| 12   | QPSK       | 0.5       | 2     | 96    | 48    | −10 | −79         | 13  | 29   |
| 18   | QPSK       | 0.75      | 2     | 96    | 72    | −13 | −77         | 11  | 27   |
| 24   | 16-QAM     | 0.5       | 4     | 192   | 96    | −16 | −74         | 8   | 24   |
| 36   | 16-QAM     | 0.75      | 4     | 192   | 144   | −19 | −70         | 4   | 20   |
| 48   | 64-QAM     | 0.666     | 6     | 288   | 192   | −22 | −66         | 0   | 16   |
| 54   | 64-QAM     | 0.75      | 6     | 288   | 216   | −25 | −65         | −1  | 15   |

TABLE 2

Channelization for Table 1

| Channel | Frequency (MHz) |
|---------|-----------------|
| 1       | 2412            |
| 2       | 2417            |
| 3       | 2422            |
| 4       | 2427            |

TABLE 2-continued

Channelization for Table 1

| Channel | Frequency (MHz) |
|---|---|
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |

TABLE 7-continued

Channelization for Table 6

| Channel | Frequency (MHz) |
|---|---|
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
a communication interface; and
a processor, at least one of the processor or the communication interface configured to:
generate a first packet that includes a first signal field (SIG) and a first other field, wherein the first SIG specifies a first operational mode of the first packet that is selected from a plurality of operational modes, wherein the first SIG is included within a plurality of orthogonal frequency division multiplexing (OFDM) sub-carriers and has a common location and structure as any packet based on any of the plurality of operational modes;
transmit the packet to another wireless communication device;
receive a second packet from the another wireless communication device and recover information from the second packet;
generate a third packet that includes a second SIG and a second other field, wherein the second SIG specifies a second operational mode of the third packet that is selected from the plurality of operational modes, wherein the second SIG is included within the plurality of OFDM sub-carriers and has the common location and structure as any packet based on any of the plurality of operational modes including the first SIG within the first packet; and
transmit the third packet to the another wireless communication device.

2. The wireless communication device of claim 1, wherein the at least one of the processor or the communication interface is further configured to:
generate a fourth packet that includes a third SIG and a third other field and a fourth other field, wherein the third SIG specifies a third operational mode of the fourth packet that is selected from the plurality of operational modes, wherein the third SIG is included within the plurality of OFDM sub-carriers and has the common location and structure as any packet based on any of the plurality of operational modes including the first SIG within the first packet and the second SIG within the second packet, wherein the third other field includes first data for a first other wireless communication device that is included within a first other plurality of OFDM sub-carriers, wherein the fourth other field includes second data for a second other wireless communication device that is included within a second other plurality of OFDM sub-carriers; and
transmit the fourth packet to the first other wireless communication device and the second other wireless communication device using orthogonal frequency division multiple access (OFDMA) signaling.

3. The wireless communication device of claim 1, wherein the at least one of the processor or the communication interface is further configured to:
receive the second packet from the another wireless communication device and recover information from the second packet in response to the first packet, wherein the second packet includes at least one of an acknowledgement (ACK) or feedback generated by the another wireless communication device.

4. The wireless communication device of claim 1, wherein the at least one of the processor or the communication interface is further configured to:
downclock a first clock signal using a downclocking factor to generate a second clock signal, wherein the first clock signal has a first frequency that corresponds to a first channel bandwidth of a first communication protocol, and the second clock signal has a second frequency that corresponds to a second channel bandwidth of a second communication protocol; and
generate the first packet using the second clock signal.

5. The wireless communication device of claim 1, wherein the at least one of the processor or the communication interface is further configured to:
transmit the packet to the another wireless communication device via a channel that is included within a frequency band that is approximately 6 Mega-Hertz (MHz) and has a lower edge equal to or greater than approximately 54 MHz, wherein the channel has band edge attenuation based on a spectral mask requirement associated with a broadcast television channel.

6. The wireless communication device of claim 1, wherein the at least one of the processor or the communication interface is further configured to:
transmit the packet to the another wireless communication device via a channel that is included within a frequency band that is approximately 7 Mega-Hertz (MHz) or 8 MHz, wherein the channel has band edge attenuation based on a spectral mask requirement associated with a broadcast television channel.

7. The wireless communication device of claim 1, wherein the at least one of the processor or the communication interface is further configured to:
generate the first packet that includes the first SIG and the first other field, wherein the first other field is included within a first other plurality of OFDM sub-carriers; and
generate the second packet that includes the second SIG and the second other field, wherein the second other field is included within a second other plurality of OFDM sub-carriers.

8. The wireless communication device of claim 1 further comprising:
an access point (AP), wherein the another wireless communication device is a wireless station (STA).

9. A wireless communication device comprising:
a communication interface; and
a processor, at least one of the processor or the communication interface configured to:
generate a first packet that includes a first signal field (SIG) and a first other field, wherein the first SIG specifies a first operational mode of the first packet that is selected from a plurality of operational modes, wherein the first SIG is included within a plurality of orthogonal frequency division multiplexing (OFDM) sub-carriers and has a common location and structure as any packet based on any of the plurality of operational modes;
transmit the first packet to a first other wireless communication device;
generate a second packet that includes a second SIG and a second other field, wherein the second SIG specifies a second operational mode of the second packet that is selected from the plurality of operational modes, wherein the second SIG is included within the plurality of OFDM sub-carriers and has the common location and structure as any packet based on any of the plurality of operational modes including the first SIG within the first packet; and
transmit the first packet to the first other wireless communication device or a second other wireless communication device.

10. The wireless communication device of claim 9, wherein the at least one of the processor or the communication interface is further configured to:

receive a third packet from the first other wireless communication device and recover information from the third packet;

generate a fourth packet that includes a third SIG and a third other field, wherein the third SIG specifies a third operational mode of the fourth packet that is selected from the plurality of operational modes, wherein the third SIG is included within the plurality of OFDM sub-carriers and has the common location and structure as any packet based on any of the plurality of operational modes including the first SIG within the first packet and the second SIG within the second packet; and transmit the fourth packet to the first other wireless communication device.

11. The wireless communication device of claim 9, wherein the at least one of the processor or the communication interface is further configured to:

downclock a first clock signal using a downclocking factor to generate a second clock signal, wherein the first clock signal has a first frequency that corresponds to a first channel bandwidth of a first communication protocol, and the second clock signal has a second frequency that corresponds to a second channel bandwidth of a second communication protocol; and generate at least one of the first packet or the second packet using the second clock signal.

12. The wireless communication device of claim 9, wherein the at least one of the processor or the communication interface is further configured to:

transmit at least one of the first packet to the first other wireless communication device or the second packet to the second other wireless communication device via a channel that is included within a frequency band that is approximately 6 Mega-Hertz (MHz) and has a lower edge equal to or greater than approximately 54 MHz, wherein the channel has band edge attenuation based on a spectral mask requirement associated with a broadcast television channel.

13. The wireless communication device of claim 9 further comprising:

an access point (AP), wherein at least one of the first other wireless communication device or the second other wireless communication device includes a wireless station (STA).

14. A method for execution by a wireless communication device, the method comprising:

generating a first packet that includes a first signal field (SIG) and a first other field, wherein the first SIG specifies a first operational mode of the first packet that is selected from a plurality of operational modes, wherein the first SIG is included within a plurality of orthogonal frequency division multiplexing (OFDM) sub-carriers and has a common location and structure as any packet based on any of the plurality of operational modes;

transmitting, via a communication interface of the wireless communication device, the first packet to a first other wireless communication device;

generating a second packet that includes a second SIG and a second other field, wherein the second SIG specifies a second operational mode of the first second packet that is selected from the plurality of operational modes, wherein the second SIG is included within the plurality of OFDM sub-carriers and has the common location and structure as any packet based on any of the plurality of operational modes including the first SIG within the first packet; and transmitting, via the communication interface of the wireless communication device, the first packet to the first other wireless communication device or a second other wireless communication device.

15. The method of claim 14 further comprising:

receiving, via the communication interface of the wireless communication device, a third packet from the first other wireless communication device and recovering information from the third packet;

generating a fourth packet that includes a third SIG and a third other field, wherein the third SIG specifies a third operational mode of the fourth packet that is selected from the plurality of operational modes, wherein the third SIG is included within the plurality of OFDM sub-carriers and has the common location and structure as any packet based on any of the plurality of operational modes including the first SIG within the first packet and the second SIG within the second packet; and transmitting, via the communication interface of the wireless communication device, the fourth packet to the first other wireless communication device.

16. The method of claim 14 further comprising:

downclocking a first clock signal using a downclocking factor to generate a second clock signal, wherein the first clock signal has a first frequency that corresponds to a first channel bandwidth of a first communication protocol, and the second clock signal has a second frequency that corresponds to a second channel bandwidth of a second communication protocol; and generating at least one of the first packet or the second packet using the second clock signal.

17. The method of claim 14 further comprising:

transmitting, via the communication interface of the wireless communication device, at least one of the first packet to the first other wireless communication device or the second packet to the second other wireless communication device via a channel that is included within a frequency band that is approximately 6 Mega-Hertz (MHz) and has a lower edge equal to or greater than approximately 54 MHz, wherein the channel has band edge attenuation based on a spectral mask requirement associated with a broadcast television channel.

18. The method of claim 14 further comprising:

transmitting, via the communication interface of the wireless communication device, at least one of the first packet to the first other wireless communication device or the second packet to the second other wireless communication device via a channel that is included within a frequency band that is approximately 7 Mega-Hertz (MHz) or 8 MHz, wherein the channel has band edge attenuation based on a spectral mask requirement associated with a broadcast television channel.

19. The method of claim 14 further comprising:

generating the first packet that includes the first SIG and the first other field, wherein the first other field is included within a first other plurality of OFDM sub-carriers; and generating the second packet that includes the second SIG and the second other field, wherein the second other field is included within a second other plurality of OFDM sub-carriers.

20. The method of claim 14, wherein the wireless communication device is an access point (AP), wherein at least one of the first other wireless communication device or the second other wireless communication device includes a wireless station (STA).

\* \* \* \* \*